United States Patent [19]

Endo et al.

[11] 4,182,989
[45] Jan. 8, 1980

[54] SYSTEM FOR ESTABLISHING A COMMUNICATION LINK BETWEEN A GROUND STATION AND EACH OF VEHICLE DRIVERS WITHIN A IMITED COMMUNICATION AREA

[75] Inventors: Hiroshi Endo, Yokosuka; Kosaku Baba, Yokohama, both of Japan

[73] Assignee: Nissan Motor Company, Inc., Yokohama, Japan

[21] Appl. No.: 922,660

[22] Filed: Jul. 7, 1978

Related U.S. Application Data

[63] Continuation of Ser. No. 735,746, Oct. 26, 1976, abandoned.

[30] Foreign Application Priority Data

Oct. 24, 1975 [JP] Japan .................. 50/127518

[51] Int. Cl.² .................................. H04B 1/00
[52] U.S. Cl. .................................. 325/53; 325/55; 325/64; 340/312; 340/23
[58] Field of Search .............. 325/55, 53, 64, 4, 31, 325/6, 16, 117; 340/23, 24, 147 PC, 312; 179/15.55 T, 15 AC

[56] References Cited

U.S. PATENT DOCUMENTS

| | | | |
|---|---|---|---|
| 2,941,201 | 6/1960 | Babcock | 325/117 |
| 3,042,303 | 7/1962 | Kendall | 235/92 EV |
| 3,555,424 | 1/1971 | Malm | 325/55 |
| 3,568,161 | 3/1971 | Knickel | 340/24 |
| 3,588,371 | 6/1971 | Monte | 325/64 |
| 3,739,329 | 6/1973 | Lester | 340/312 |
| 3,757,290 | 9/1973 | Ross | 340/23 |
| 3,764,915 | 10/1973 | Cox | 325/55 |
| 3,886,515 | 5/1975 | Cottin | 340/23 |
| 3,973,200 | 8/1976 | Akerberg | 325/64 |
| 3,984,807 | 10/1976 | Haemmig | 340/23 |

*Primary Examiner*—Robert L. Richardson
*Assistant Examiner*—Tommy P. Chin
*Attorney, Agent, or Firm*—Schwartz, Jeffery, Schwaab, Mack, Blumenthal & Koch

[57] ABSTRACT a system for establishing a communication link between a ground station and each of vehicle drivers, wherein information is transferred in a compressed manner with respect to time while a vehicle moves within a limited communication area defined over a road surface by a UHF antenna.

12 Claims, 18 Drawing Figures

SYSTEM FOR ESTABLISHING A COMMUNICATION LINK BETWEEN A GROUND STATION AND EACH OF VEHICLE DRIVERS WITHIN A LIMITED COMMUNICATION AREA

This is a continuation of application Ser. No. 735,746, filed Oct. 26, 1976.

This invention relates generally to a system for establishing a communication link between a vehicle driver and a traffic controller, and more particularly to a system for establishing such a communication link while a vehicle moves within a limited communiction area defined on the roadway by a UHF antenna assembly.

Effective control of modern highways and city streets requires continuous availability of information by unidirectional communication from a traffic controller to a vehicle driver or bidirectional communication therebetween. Therefore, many attempts for this communication have been proposed and developed. One of these attempts is to use radio broadcasting. However, the radio broadcasting is not suitable for the traffic control in that it is a unidirectional communication and is not able to individually control travelling vehicles. Another is bidirectional communication by using mobile transceivers, but, this is also unsuitable, in that there are very few frequency bands which can be allocated for mobile communication. Another is to employ inductive coupling between a cable provided along a traffic lane and a plurality of antennas mounted in travelling vehicles, which is, however, also unsuitable for individual control of vehicles, since it is difficult to completely remove interferences of different informations coming at the same time from the vehicles, and, on the other hand, to precisely transmit information from the ground or base station to an intended vehicle. Still another is communication by using a loop antenna placed in the road surface, each of which loop antennas establishes a communication link with a suitable antenna mounted in a vehicle when the vehicle goes over it. However, this system uses considerably low frequency, for example, 200 kHz, so that large volume of information cannot be transmitted.

The present invention is, therefore, concerned with an improved system which establishes a communication link between a vehicle driver and a traffic controller without the afore-mentioned defects inherent in the prior art. In accordance with the present invention, the communication system generally comprises a first UHF antenna, which has a sharp directional characteristic, being fixed at a support in the air and facing a road surface; a first commuication unit connected to said first UHF antenna and including a transmitter and a receiver; an audio means for converting a voice into a corresponding electrical audio signal and vice versa, which audio means is connected to the first communication unit; a second UHF antenna, which has a sharp directional characteristic, being fixedly attached to the vehicle for being carried thereby and directing upwards; a second communication unit mounted in the vehicle and connected to the second UHF antenna including a transmitter and a receiver; another audio means for converting a voice into a corresponding electrical audio signal and vice versa, which audio means is connected to the second communication unit, the communication link being established through the first and second UHF antenna within a limited communication area defined by the first UHF antenna, each of the two transmitters including means for compressing the electrical audio signal from the audio means at a predetermined ratio with respect to time, and means for modulating UHF carrier by the compressed audio electrical signal, the modulated UHF signal being fed to the first and the second UHF antenna in order to be radiated therefrom, and each of the two receivers including means for detecting the compressed audio electrical signal from the modulated UHF signal, and means for reproducing the audio electrical signal from the compressed audio electrical signal which is fed to the audio means.

It is understood from the foregoing that, in accordance with the present invention, a communication link between a ground station and each of the vehicle drivers can be established while the vehicle moves within the limited communication area defined over the road surface by a UHF antenna. This results from the fact that the electrical audio signal is transferred in a compressed manner with respect to time, thereby to instantaneously transfer a large volume of information. In the above, a series of peripheral units of the ground station is located at intervals along a traffic lane, so that a plurality of such communication links can be established as the vehicle travels. Therefore, control of the highways and city streets can be carried out much more effectively than the prior art.

It is therefore a primary object of the present invention to provide an improved system for establishing a communication link between a base station and each of vehicle drivers.

Another object of the present invention is to provide an improved system for establishing a communication link between a base station and each of vehicle drivers, in which a large volume of information is transferred in a compressed manner with respect to time while the vehicle moves within a limited communication area defined over the road surface by a UHF antenna.

Still another object of the present invention is to provide an improved system for establishing a communication link between a base station and each of vehicle drivers, which system comprises a memory device and a memory noise removing unit for removing electrical noise resulting from partial defects of the memory device.

These and other objects, features and many of the attendant advantages of this invention will be appreciated more readily as the invention becomes better understood by the following detailed description, wherein like parts in each of the several figures are identified by the same reference characters, and wherein.

Figure 1:
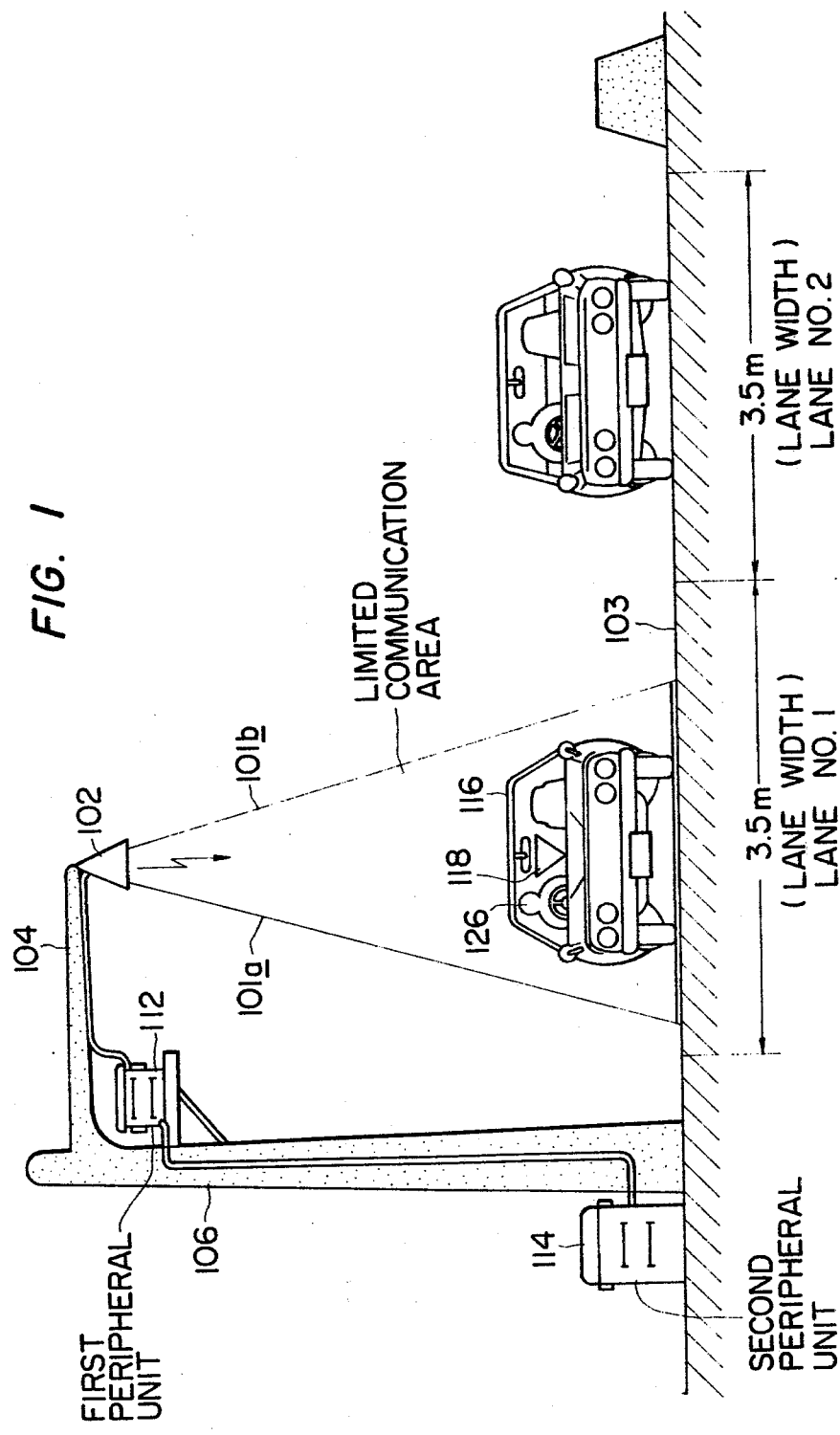
FIG. 1 illustrates a vehicle within a limited communication area and some electronic units of a preferred embodiment of the present invention.

Reference is now made to accompanying drawings, first to FIG. 1, which illustrates a vehicle within a limited communication area and some electronic units of a preferred embodiment of the present invention, etc. An UHF antenna assembly 102 with a sharp directional characteristic is fixedly attached to an arm 104 extending from a suitable support 106 and facing a road surface 103 in the lane No. 1 to radiate an UHF signal therefrom, thereby to define a limited communication area indicated by lines 101a, 101b and the road surface 103. The UHF antenna assembly 102 is electrically connected to a first peripheral unit 112 which is in turn connected to a second peripheral unit 114. Communication between a vehicle driver 126 in a vehicle 116 and a traffic controller (not shown) is established substantially instantaneously, while the vehicle 116 moves within the limited communication area, by means of a UHF antenna 118 mounted in the vehicle 116, the UHF antenna assembly 102, and UHF transmitters and receivers (not shown) connected to the UHF antenna assembly 102 and the UHF antenna 118.

Figure 2:
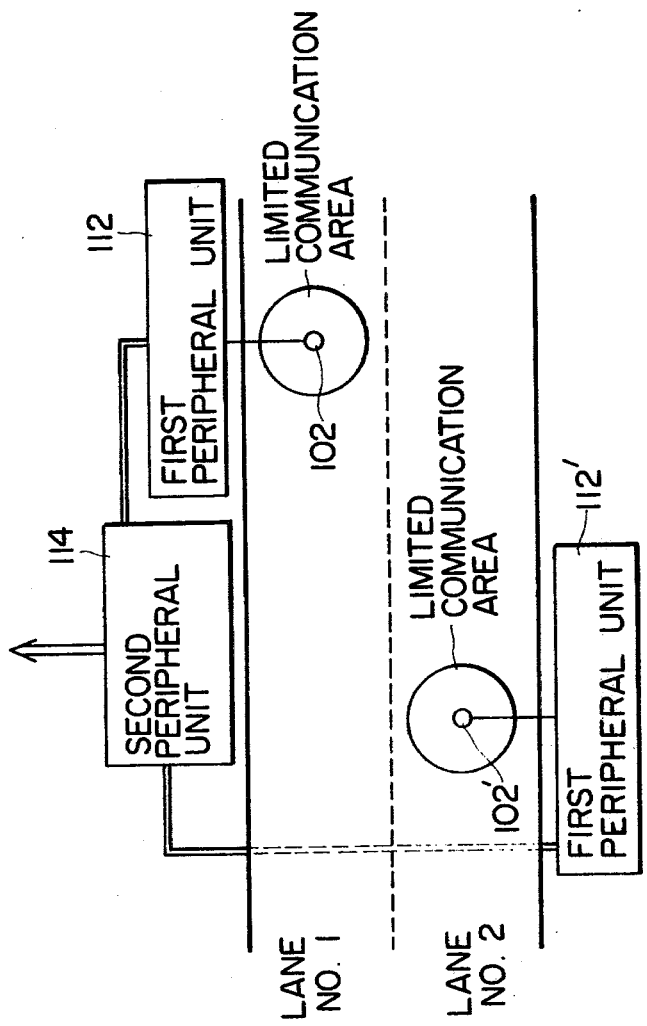
FIG. 2 is a plan view illustrating two communication areas provided on the road surface together with peripheral units in block.

FIG. 2 is a plan view illustrating two communication areas (no numerals) provided on the road surface 103 together with peripheral units in block. One of the two communication areas is established on the lane No. 1 and corresponds to that of FIG. 1, and the other is established on the lane No. 2. The difference between the arrangements of FIGS. 1 and 2 is that in FIG. 2 the second peripheral unit 114 is connected to, besides the first peripheral unit 112, another second peripheral unit 112' which is coupled to a UHF antenna assembly 102'. The antenna assembly 102' defines the other communication area on the lane No. 2. Thus, it is understood that, in accordance with the embodiment of FIG. 2, wider communication between the vehicle drivers and the traffic controller can be established.

Figure 3:
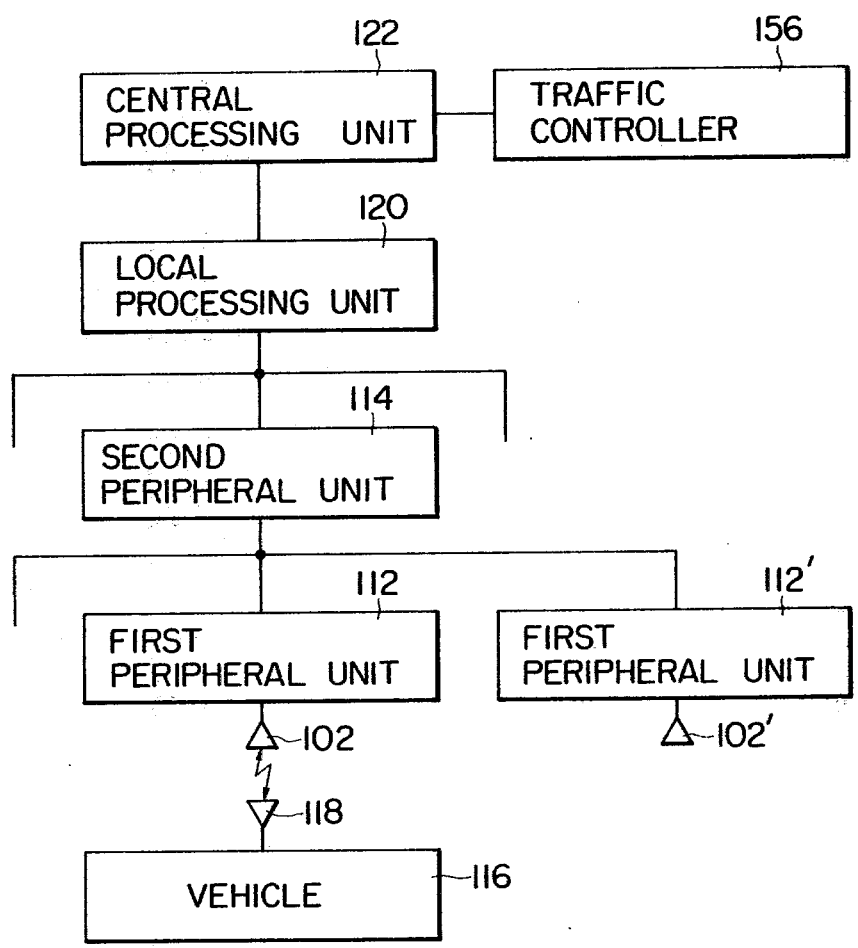
FIG. 3 is a schematic block diagram of another embodiment of the present invention for establishing much wider communication between each of vehicle drivers and a traffic controller.

FIG. 3 is a block diagram schematically illustrating another embodiment of the present invention for establishing much wider communication between the vehicle driver (not shown) and the traffic controller 156. As shown, the second peripheral unit 114 is connected to a central processing unit 122 through a local processing unit 120. Although not shown in the drawing, a plurality of first peripheral units can be connected to the second peripheral unit 114, and a plurality of second peripheral units can be connected to the local processing unit 120, and furthermore a plurality of local processing units 120 being also connected to the central processing unit 122. Thus, by using the information processing units such as 120 and 122, many communication links between the vehicle driver and the traffic controller 156 can be established. This is very advantageous in that control of modern highways and city streets can be effectively performed by the much more communications between each of the vehicle drivers and the traffic controller 156.

Figure 4:
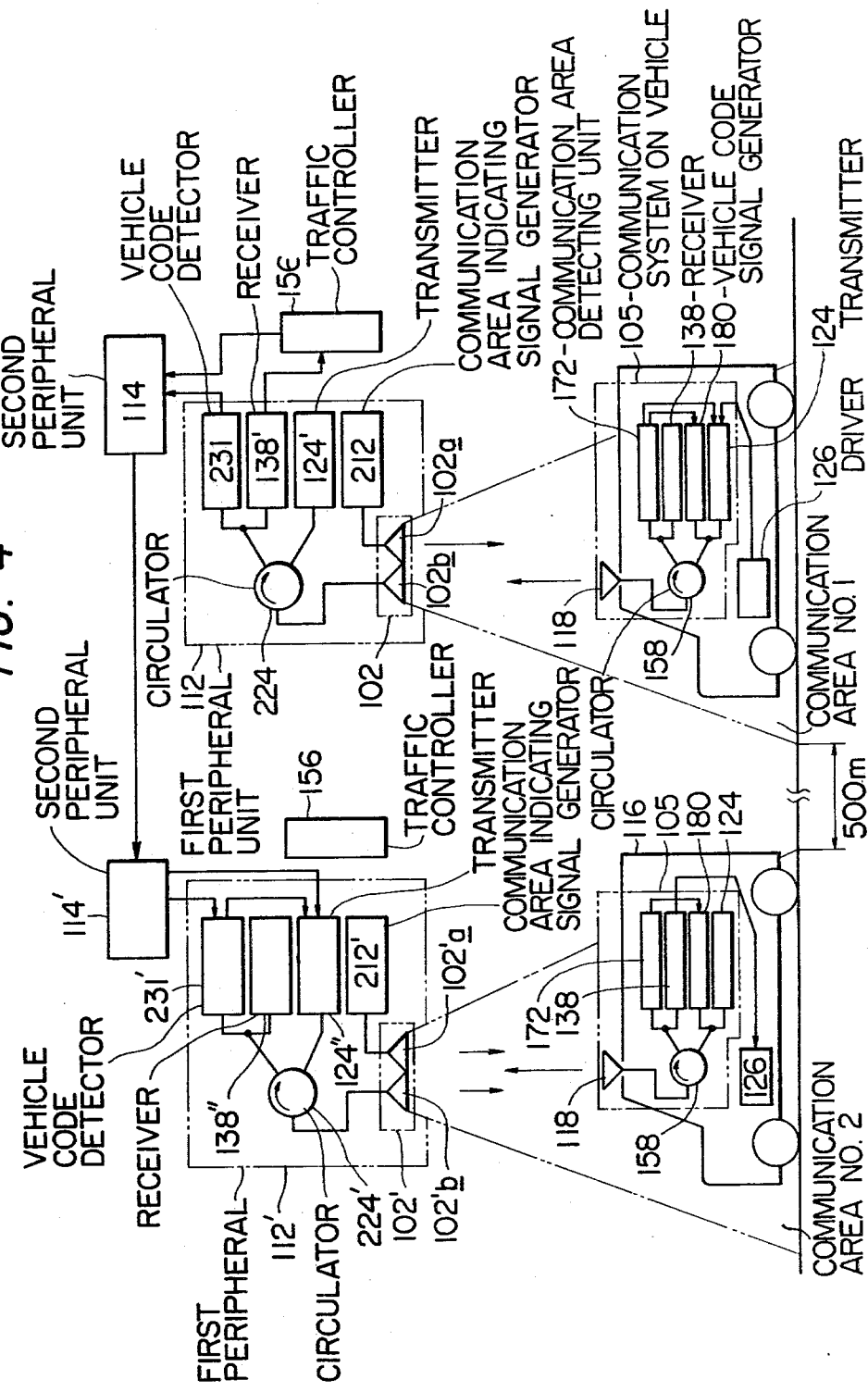
FIG. 4 is a schematic block diagram illustrating one of preferred embodiments of the present invention for establishing a communication link between a vehicle driver and a traffic controller.

Reference is now made to FIG. 4, which is a schematic block diagram illustrating one of the preferred embodiments of the present invention for establishing a communication link between the vehicle driver 126 and the traffic controller 156. The vehicle driver 126 speaks into a microphone (not shown) inquiring, for example, "Where is the A building?" or "Where is a gas station in the neighborhood?" In this case, before the vehicle 116 enters a communication area No. 1, the inquiry of the vehicle driver 126, which is in the form of an electrical signal, should be stored in a transmitter 124. When the vehicle 116 enters the communication area No. 1 defined by the UHF antenna assembly 102 consisting of two antennas 102a and 102b, a communication area detecting unit 172 of a communication system 105, which is mounted in the vehicle, receives a signal from a communication area indicating signal generator 212 through the antennas 102a, 118, and a circulator 158. Upon reception of this signal from the generator 212, a vehicle code signal is transmitted from a vehicle code signal generator 180 to a vehicle code detecting unit 231 through the antennas 118, 102b, and a circulator 224. The detecting unit 231 detects the vehicle code to supply it to the second peripheral processing unit 114. Then, immediately thereafter, the inquiry, which has been previously stored in the transmitter 124, is superimposed upon or modulates an UHF carrier generated in the transmitter 124. The modulated UHF energy is radiated through the antenna 118 in the compressed manner with respect to time. The signal thus radiated is received by the UHF antenna 102b to be led to a receiver 138' of the first peripheral processing unit 112, wherein the signal representative of the inquiry is demodulated to be converted into an audible signal which is received by the traffic controller 156. The traffic controller 156 then supplies the second peripheral processing unit 114 with his message against the vehicle driver's inquiry through a suitable microphone (not shown) for a given time period, for example, 8 seconds. Following, the detected vehicle code signal is transferred, through the unit 114 and another second peripheral processing unit 114', to a vehicle code detecting unit 231' of another first peripheral processing unit 112' to be stored therein, and on the other hand, the message of the traffic controller 156 against the inquiry is also transferred, through the units 114 and 114', to a transmitter 124" to be stored therein. In the above, the second peripheral processing unit 114' is provided in such a manner as to be away from the unit 114 by, for example, more than 500 meters. However, in this case, if the vehicle 116 runs at the speed of 50 Km/hour, it takes about 37 seconds for the vehicle 116 to reach a communication area No. 2 after leaving the communication area No. 1.

When the vehicle 116 enters the communication area No. 2 defined by the UHF antenna assembly 102' consisting of two antennas 102'a and 102'b, the communication area detecting unit 172 receives a signal from a communication area indicating signal generator 212' through the antennas 102'a, 118, and the circulator 158. Upon reception of this signal from the generator 212', the vehicle code signal is transmitted from the vehicle code signal generator 180 to a vehicle code detecting unit 231' through the antennas 118, 102b, and a circulator 224'. In the vehicle code detecting unit 231', the vehicle code signal transferred from the vehicle 116 in the communication area No. 2 is compared with the vehicle code already transferred from the second peripheral processing unit 114. If the former is identical to the latter, the message of the traffic controller 156 already stored in the transmitter 124" is read therefrom in the compressed manner with respect to time, modulating a UHF carrier generated in the transmitter 124". The modulated UHF signal is then transmitted to the receiver 138 mounted in the vehicle 116 through the antennas 102'b and 118. The modulated UHF signal thus received by the receiver 138 is demodulated to be an audible message in the receiver 138. Thus, the vehicle driver 126 can receive the message from the traffic controller 156. In the above, the vehicle and the ground station each is equipped with both of the transmitter and the receiver for establishing a bidirectional communication between the vehicle driver and the traffic controller. However, when an unidirectional communication is only required, the transmitter and the receiver respectively provided in the vehicle and the ground station or vice versa can be omitted.

Figure 5:
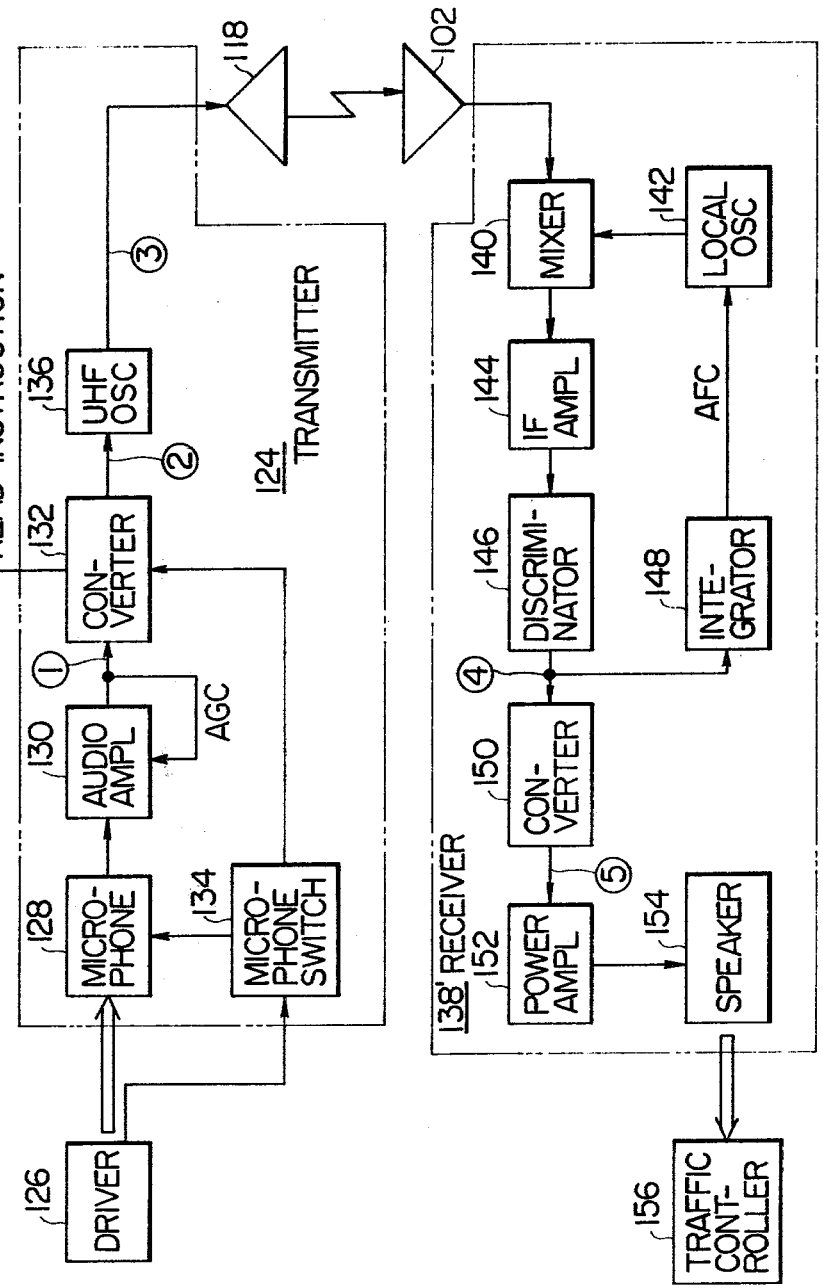
FIG. 5 is a detailed block diagram of units of FIG. 4.
Figure 6:
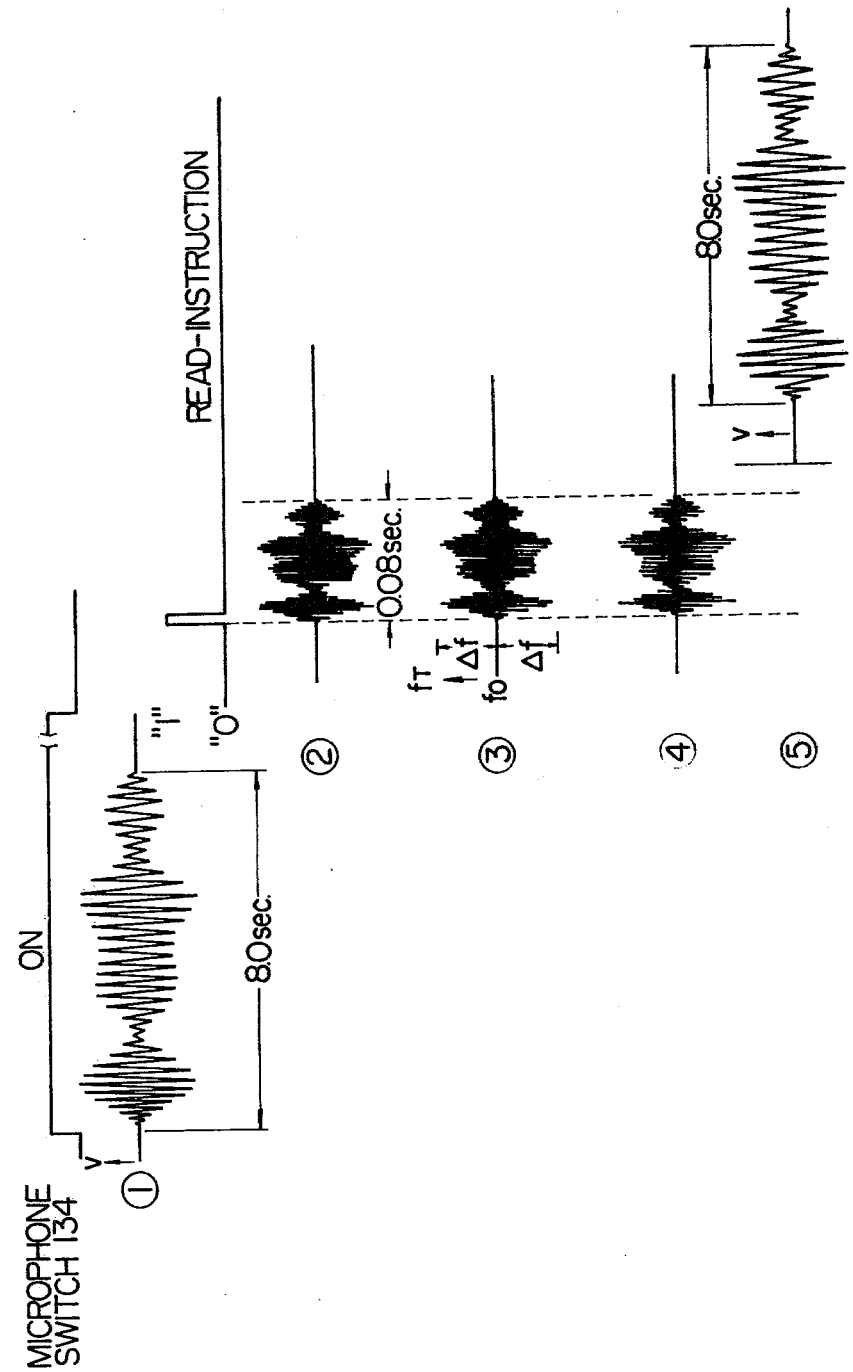
FIG. 6 is various wave forms appearing at various parts of the block diagram of FIG. 5.

Reference is now made to FIGS. 5 and 6, wherein FIG. 5 is a detailed block diagram of the transmitter 124 and the receiver 138' of FIG. 4, and FIG. 6 is various wave forms appearing at various parts of the block diagram of FIG. 5. Each of reference numerals 1 to 5 of FIG. 5 denotes a wave form of FIG. 6 with like reference numeral.

The vehicle driver 126 switches on a microphone switch 134 to speak into a microphone 128 inquiring, for example, "Where is the A building?" or "Where is a gas station in the neighborhood?". The microphone 128 converts the driver's voice into an electrical signal corresponding thereto, which signal is fed to an audio amplifier 130 which generates an amplified signal 1 therefrom. The gain of the amplifier 130 is automatically controlled by an AGC circuit (not shown) with a time constant of approximately 0.2–0.3 seconds. The signal from the amplifier 130 is fed to a converter 132 which comprises, although not shown in the drawing, an A-D converter, a D-A converter and a memory. The circuit arrangement and function of the converter 132 will be fully described later, however, at this present, only simple description thereof will be given in connection with FIG. 5. The analog signal from the amplifier 130 is converted into a digital one by the A-D converter, then being stored in the memory. In this case, the signal to be stored in the memory is one which is spoken into the microphone 128 for 8 seconds after the driver switches on the switch 134.

After the signal from the amplifier 130 has been stored in the memory of the converter 132, when the vehicle 116 enters the communication area defined by the UHF antenna assembly 102, the converter 132 receives a read instruction signal. Then, the inquiry stored in the memory in the digital form is read 100 times faster than it is stored and is converted into an analog signal 2 by the D-A converter (not shown). It is therefore understood that the input signal to the converter 132 for 8 seconds is compressed with respect to time to be the signal 2 with a time period of 0.08 seconds. The signal 2 is then fed to a UHF oscillator 136, frequency-modulating a UHF carrier thereat. As the UHF oscillator 136, various UHF oscillators can be used which are, for example, an oscillator using a Gunn effect and having a cavity with a varactor therein, or an oscillator using a klystron. The output of the UHF oscillator 136, which has been frequency-modulated and is denoted by reference numeral 3, radiates into the free space through the UHF antenna 118 with a sharp directional characteristic. The wave form of the signal 3 is shown in FIG. 6, wherein $f_o$ is a center frequency, $f_T$ is a carrier frequency, and $\Delta f$ is a maximum deviation from the carrier frequency $f_T$.

The signal radiated from the UHF antenna 118 is received by the UHF antenna assembly 102, and the signal thus received is then fed to a mixer 140, which is connected to a local oscillator 142, generates an i-f (intermediate frequency) signal therefrom as is well known in the art. As the local oscillator 142, a suitable UHF oscillator can be used which is, for example, an oscillator using Gunn effect. The i-f signal from the mixer 140 is then fed to an i-f amplifier 144 to be amplified therein to a predetermined value. The amplified signal is fed to a frequency discriminator 146 wherein the compressed signal 3 is demodulated to be a signal 4. The signal 4 is then fed to an integrator 148 to be integrated thereat. The integrator 148 has a time constant much larger than the repetition rate of the compressed signal. The signal from the integrator 148 is fed to the local oscillator 142 in order to automatically control the oscillating frequency thereof. On the other hand, the signal 4 is fed to a converter 150 which is provided with, although not shown, an A-D converter, a D-C converter and a memory just as the converter 132. The converter 150, at first hand, converts the analog signal from the discriminator 146 into a digital one by the A-D converter, and then stores the same in the memory, and finally read the stored signal at a speed of one hundredth of that of the storing speed. Thus, the converter 150 generates a signal 5 corresponding to the signal 1. The signal 5 is then fed to a power amplifier 152 which drives a speaker 154, thus a traffic controller 156 can receive the driver's inquiry by his ears.

Figure 7:
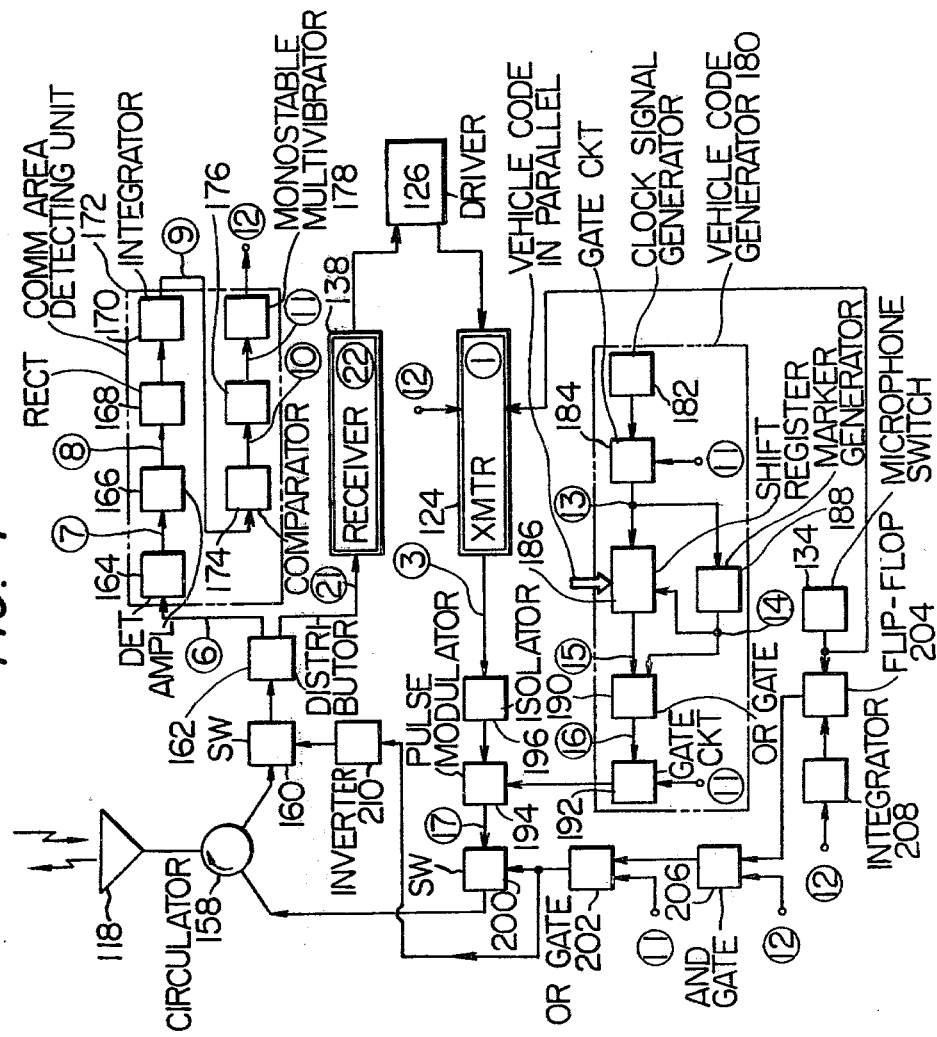
FIG. 7 is a detailed block diagram of a unit of FIG. 4.
Figure 8:
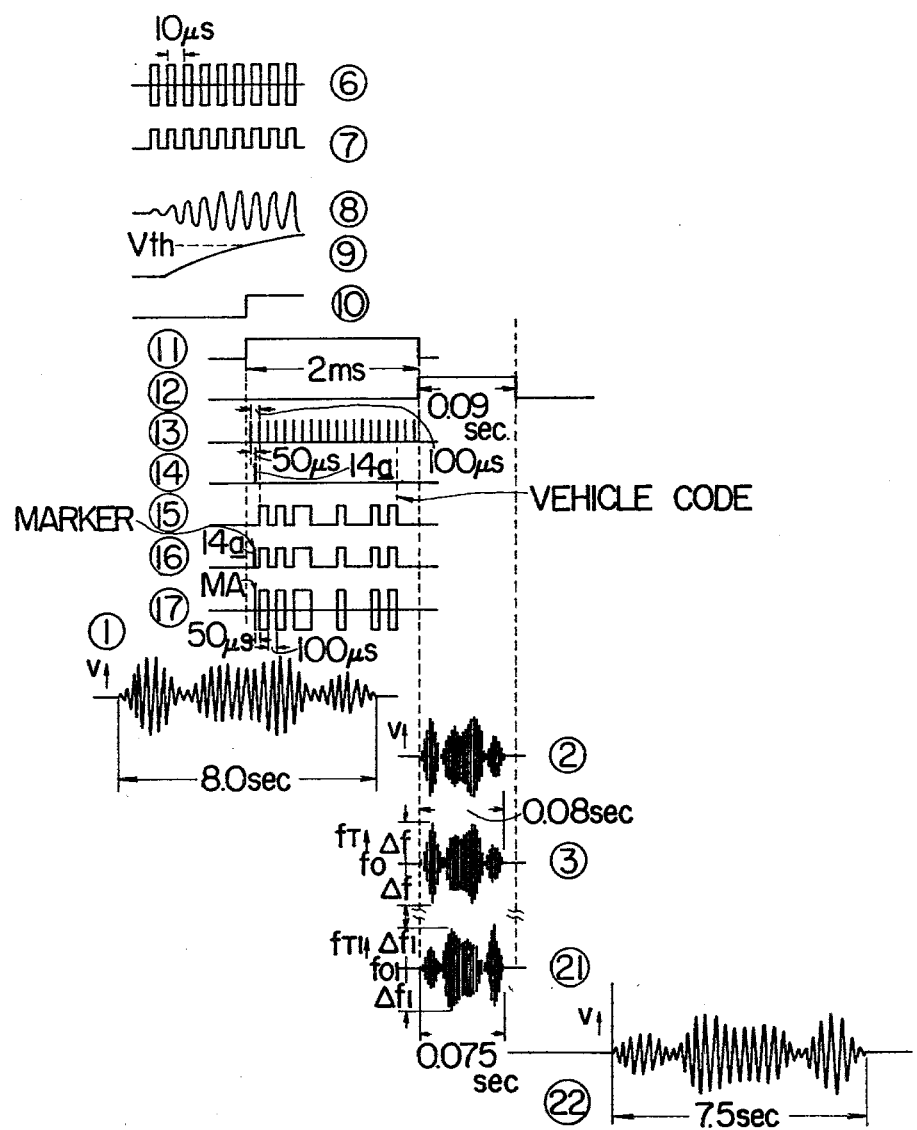
FIG. 8 is various wave forms appearing at various parts of the block diagram of FIG. 7.

Referring now to FIGS. 7 and 8, wherein FIG. 7 is a preferred and detailed block diagram of the communication system 105 (FIG. 4) mounted in the vehicle 116 and FIG. 8 is various wave forms appearing at various parts of the block diagram of FIG. 7, and wherein each of reference numerals 6–22 of FIG. 7 denotes a wave form of FIG. 6 with like reference numeral.

When the vehicle (not shown in FIG. 7) enters the communication area No. 1 defined by the UHF antenna assembly 102 (FIG. 4), the antenna 118 mounted in the vehicle receives a communication area indicating signal 6 through the antenna 102a (FIG. 4). As shown in FIG. 8, the signal 6 is a pulsating one which is produced by pulse-modulating a UHF carrier by square waves of 100 kHz, as will be described in connection with FIGS. 9 and 10. The signal 6 is always emitted from the antenna 102a. The signal 6 thus received is fed to a UHF distributor 162 through the circulator 158 and a normal open UHF switch 160. As is known in the art, a circulator is a waveguide component having a number of terminals so arranged that energy entering one terminal is transmitted to the next adjacent terminal in a particular direction. The UHF distributor 162 usually comprises a so-called directional coupler which couples a secondary system only to a travelling in a particular direction in a primary transmission system while completely ignoring a wave travelling in the opposite direction. The signal 6 from the distributor 162 is then fed to a detector 164 of a communication area detecting unit 172, which detector 164 generates a detected signal 7. The signal 7 is then supplied to a narrow band amplifier 166 with a center frequency of 100 kHz, at which the signal 7 is amplified to a predetermined level to be a 100 kHz sine wave signal 8. The signal 8 is fed to a rectifier 168 which generates a full-wave rectified signal (not shown). The rectified signal is then fed to an integrator 170 with a time constant 10 ms and is smoothed thereat to be a signal 9. The signal 9 is then fed to a comparator 174 with a predetermined threshold value, which comparator 174 generates a step signal indicated by reference numeral 10. The signal 10 actuates, by its rising edge, a monostable multivibrator 176 which has an unstable time of 2 ms and generates a signal 11. The signal 11 in turn actuates, by its falling edge, a monostable multivibrator 178 which has an unstable time of 0.09 seconds and generates a signal 12 with a pulse width of 0.09 seconds.

Reference is now made to a vehicle code generator 180 of FIG. 7. The signal 11 from the monostable multivibrator 176 is fed to a gate circuit 184 which is open, while the signal 11 indicates a logic "1", to pass a 10 kHz clock signal from a clock signal generator 182. The clock signal from the gate circuit 184 is denoted by reference numeral 13 and has a repetition rate of 100 μs. The signal 13 is fed to a marker generator 188 which generates a signal 14 with a marker 14a. On the other hand, the clock signal 13 is also fed to a 16-bit shift register 186 in order to time the same to write a parallel binary vehicle code in the serial form. As shown in FIG. 8, the vehicle code is assumed to be 1010110001000101 in binary. In this case, the signal 14 from the marker generator 188 is fed to the shift register 186, initiating the writing process thereof. Thus, the output of the shift register 186, which indicates the vehicle code in binary, is fed to an OR circuit 190 to which the signal 14 is also applied. The signals 14 and 15 are added at the OR circuit 190, the output of which is denoted by reference numeral 16. The signal 16 is then fed to the next stage, viz., a gate circuit 192, to which the signal 11 is supplied in order to open the same only while indicating a logic "1", thus allowing the signal 16 to be fed to a pulse modulator 194 through the gate circuit 192.

The transmitter 124 generates an unmodulated UHF signal until the signal 12 is supplied thereto. The unmodulated UHF signal from the transmitter 124 is fed through an isolator 196 to the pulse modulator 194, being pulse-modulated thereat by the binary vehicle code signal from the vehicle code generator 180. The signal from the pulse modulator 194 is denoted by reference numeral 17. The signal 17 is fed to the circulator 158 through a UHF switch 200 which is open while the signal 11 is supplied to an OR circuit 202. Then the signal 17 is radiated into the limited communication area from the UHF antenna 118.

In the following, there will be described, in connection with FIGS. 7 and 8, a process for transmitting the inquiry or the message of the vehicle driver to the base station.

In order to transmit the inquiry of the vehicle driver to the base station, it is necessary to previously store the inquiry, which is converted into the electrical signal 1, in the memory (not shown) of the transmitter 124 before the vehicle enters the limited communication area No. 1 defined by the antenna 102a (FIG. 4). The inquiry to be transmitted is, as previously described, limited to what the vehicle driver speaks into the microphone 128 for 8 seconds after he switches on the microphone switch 134. When the microphone switch 134 is closed, a signal is generated therefrom which signal is led to the transmitter 124 to initiate the storing of the signal 18 in the memory (not shown). On the other hand, once the microphone switch 134 is closed, a flip-flop circuit 204 is set to supply an AND gate 206 with a logic "1". This means that the UHF switch 200 is ready for passing the output of the transmitter 124 therethrough. Under this condition, when the vehicle (not shown) enters the limited communication area, as already referred to, the communication area detecting unit 172 receives the signal 6 to sequentially generate the signals 11 and 12. The signal 12 is fed to the converter 132 (FIG. 5) of the transmitter 124 to cause the converter 132 to read the inquiry stored in the memory (not shown). Then, the inquiry stored is converted into the signal 2 which is used to modulate the UHF carrier in the transmitter 124 as already described in connection with FIG. 5. The output of the transmitter 124 is denoted by reference numeral 3, which output is led to the pulse modulator 194 through the isolator 196. The pulse modulator 194 allows the output of the transmitter 124 to pass therethrough only while the signal 11 indicates a logic "0", or in other words, while the gate circuit 192 generates no output therefrom. In the meantime, as the vehicle driver 126 has already switched on the microphone switch 134, the flip-flop 204 has been set, so that the output of the flip-flop 204 indicates a logic "1" which is fed to an AND gate 206. The AND gate 206 also receives the signal 12 to take a logical product with the signal from the flip-flop 204, thereby, in this case, to generate a logic "1". The signal indicative of a logic "1" from the AND gate 206 causes the OR gate 202 to generate a logic "1", thereby to open the switch 200. As a result, the signal 3 from the transmitter 124 is fed to the antenna 118, through the isolator 196, the pulse modulator 194, the switch 200 and the circulator 158.

In the above, the signal 12 is fed to a differentiator 208 which then generates a differentiated signal to reset the flip-flop circuit 204 by its falling edge. Therefore, it is understood that the message stored in the converter 132 (FIG. 5) of the transmitter 124 is never transmitted through the antenna 118 twice times.

As shown, an inverter 210 is connected between the switches 160 and 200, so that when the switch 160 is open the switch 220 is closed, and vice versa. Therefore, the received signal is blocked by the switch 200, and on the other hand, the signal to be transmitted is blocked by the switch 160, resulting in securing a proper operation of the communication unit mounted in the vehicle 116.

In the following, there will be described a process for receiving a message of the traffic controller against the inquiry of the vehicle driver.

In the first hand, it is assumed that the inquiry of the vehicle driver has been transmitted to the base station when the vehicle moved within the communication area No. 1 (FIG. 4). Following, when the vehicle enters the next communication area No. 2 (FIG. 4), the antenna 118 mounted in the vehicle 116 receives the signal 6 which indicates the communication area No. 2. In response to this signal 6, the communication system mounted in the vehicle transmits the vehicle code signal 17. The antenna assembly 102 of the base station receives the signal 17 by which the base station checks whether or not the message of the traffic controller should be transmitted to the vehicle from the base station. If the base station identifies the vehicle by the vehicle code signal 17, then the base station transmits a compressed message 21 to the antenna 118 instantaneously. With respect to reference numerals $f_{o1}$, $f_{T1}$ and $\Delta f_1$ of the signal 21, $f_{o1}$ is a center frequency, $f_{T1}$ the carrier frequency and $\Delta f_1$ maximum deviation from the carrier frequency $f_{T1}$. In this case, since the switch 160 is open, the signal received is fed to a receiver 138 through the circulator 158, the switch 160, and the distributor 162. The receiver 138 is identical with the receiver 138' of the base station which has been referred to in connection with FIG. 4. The compressed signal 21 is converted into an electrical audio signal 22 which is fed to the speaker 154 (FIG. 5) to reproduce the voice of the traffic controller. Thus, the vehicle driver receives the message from the base station.

Figure 9:
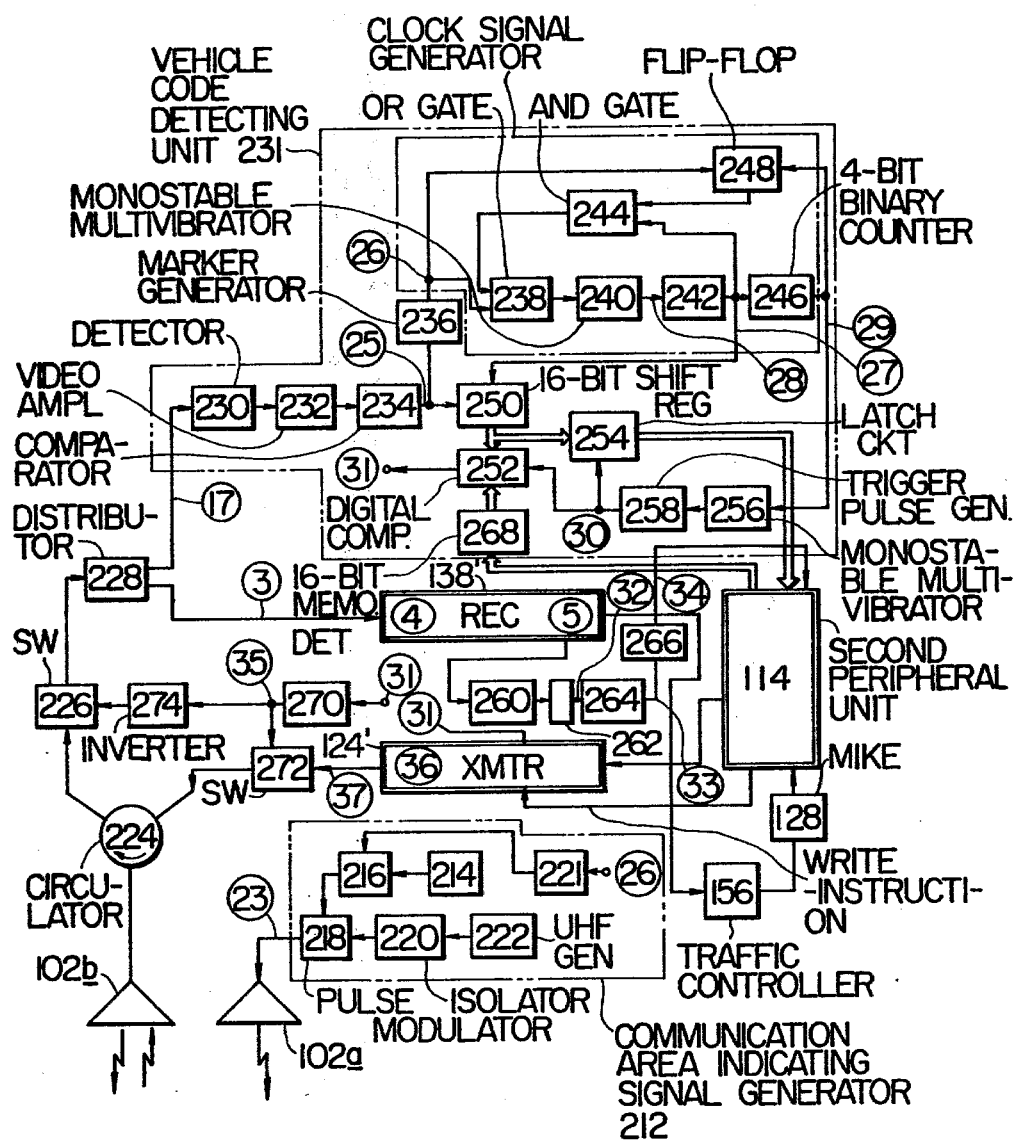
FIG. 9 is a detailed block diagram of units of FIG. 4.
Figure 10:
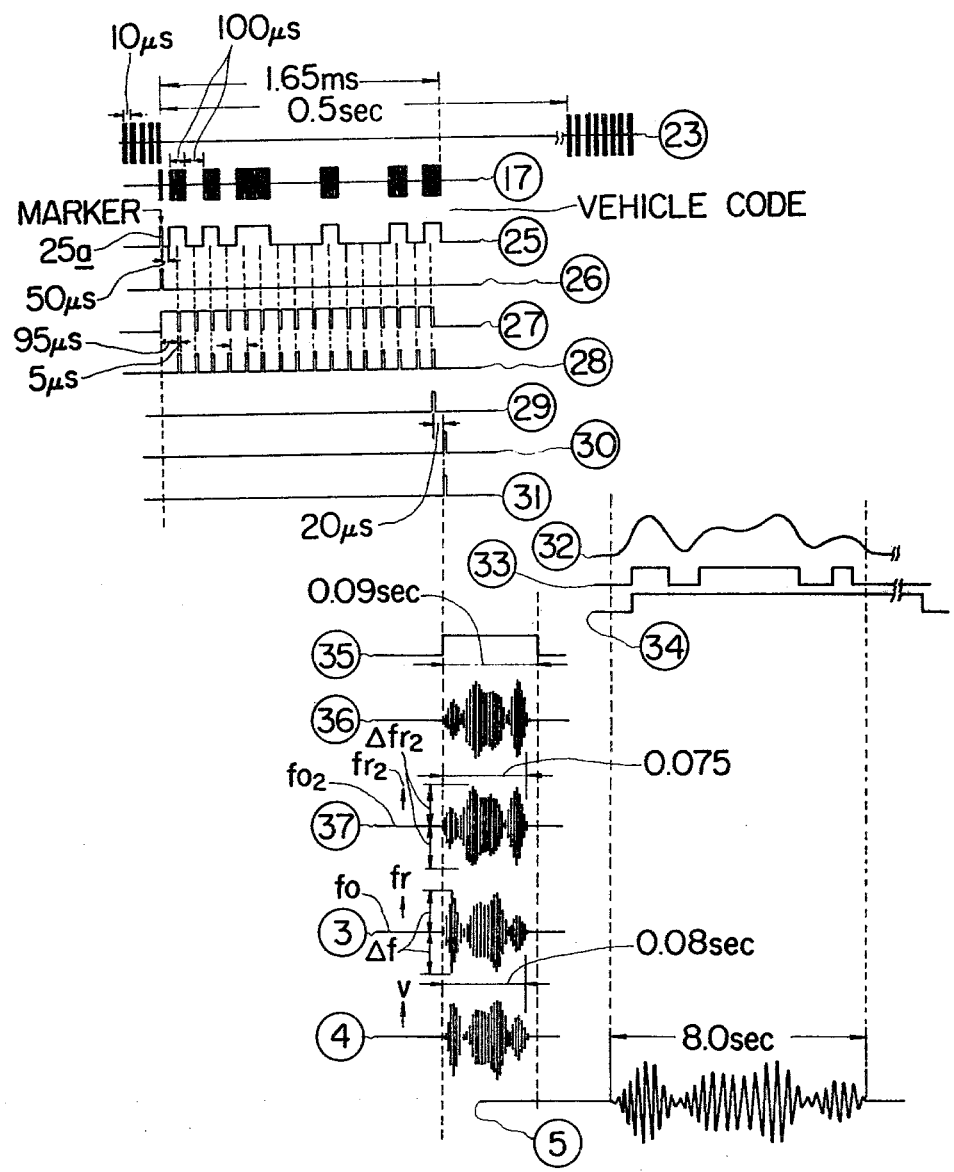
FIG. 10 is various wave forms appearing at various parts of the block diagram of FIG. 9.

Reference is now made to FIGS. 9 and 10, wherein the former is a preferred embodiment of the base station of the present invention in a block diagram and the latter is various wave forms appearing at various parts of the block diagram of FIG. 9.

When the vehicle enters the limited communication area, for example, No. 1 defined by the antenna assembly 102, the communication system in the vehicle receives a signal 23 which indicates the communication area No. 1. In the following, how the signal 23 is generated will be described. A generator 214 of a communication area indicating signal generator 212 generates a 100 kHz square wave signal which is fed to a pulse modulator 218 through a UHF switch 216. The switch 216 is normally in an open condition as described later. The pulse modulator 218 receives an unmodulated UHF carrier through an isolator 220 from an UHF generator 222, then modulating the UHF carrier by the signal from the generator 214. The signal 23 thus obtained is then fed to the antenna 102a which in turn radiates the same into the free space.

When the vehicle receives the communication area indicating signal 23, the vehicle radiates the signal 17 as previously referred to. Then, the antenna 102b receives the signal 17 which is fed to a detector 230 of a vehicle code detecting unit 231 through a circulator 224, an UHF switch 226 and a distributor 228. The detector 230 detects the audio signal involved in the signal 17, and then the detected audio signal is then fed to a video amplifier 232 at which the signal supplied is amplified to a predetermined level. The amplified signal is then fed to a comparator 234 with a threshold value, being wave-shaped to generate a signal 25 with a marker 25a of FIG. 8. The signal corresponding to the marker 14a of FIG. 8. The signal from the comparator 234 is then fed to a marker generator 236, which comprises a NAND gate circuit (not shown) and a monostable multivibrator (not shown), and which generates a signal 26 indicating the marker 25a based on the signal 25 supplied thereto. The signal 26 is fed to a monostable multivibrator 221 with an unstable time of 0.5 sec, triggering the same to generate a pulse with a pulse width of 0.5 sec. The output of the monostable multivibrator 221 is fed to the switch 216 to close the same for 0.5 sec. Thus, the signal 23 is not generated for this time period as best seen from FIG. 10. The signal 26 is fed to a monostable multivibrator 240 with an unstable time of 95 μs through an OR gate 238. The falling edge of the signal from the monostable multivibrator 240 actuates another monostable multivibrator 242 which generates a signal with an unstable time of 5 μs. The signal from the monostable multivibrator 242 is fed back to the monostable multivibrator 240 through an AND gate 244 and the OR gate 238, actuating the same by its falling edge. Each of the pulses from the multivibrator 242 is fed to a 4-bit binary counter 246 which generates a signal 29 when counting 16th pulse. The signal 29 is then fed to a flip-flop circuit 248, which has previously been set by the signal 26, to reset the same. This means that the AND gate 244 no longer actuates the monostable multivibrator 240 through the OR circuit 238. Thus, signals 27 and 28 are obtained at the output terminals of the monostable multivibrators 242 and 240, respectively.

On the other hand, the signal 25 is fed to a 16-bit shift register 250 wherein each of the pulses in the serial form is written in the parallel form by the aid of the clock signal, that is, the signal 27. The signal thus stored in the shift register 250 is transferred through its parallel output terminals (not shown) to both a digital comparator 252 and a latch circuit 254. The signal 29 from the binary counter 246 is fed to a monostable multivibrator 256, which has an unstable time of 20 μs, to cause the same to generate a pulse width of 20 μs. The pulse from the multivibrator 256 is fed to a trigger pulse generator 258 which in turn generates a comparing pulse 30. The comparing pulse 30 serves to latch the latch circuit 254 to hold the vehicle code signal thereat. The vehicle code signal held in the latch circuit 254 is transferred to the peripheral processing unit 114 when the message from the vehicle is received as will be described in the following.

The signal 3 is fed to the receiver 138' through the antenna 102b, the circulator 224, the switch 226 and the distributor 228. As previously described in connection with FIG. 5, the signal 3 is discriminated by the discriminator 146 to be the signal 4 which is supplied to the traffic controller 156 through the speaker 154. On the other hand, the signal 5 is fed to an audio signal detector 260. The detected audio signal from the detector 260 is then fed to an integrator 262 from which a signal 32 is generated. The signal 32, which has been smoothed in the integrator 262 as shown in FIG. 10, is fed to a comparator 264 with a predetermined threshold value. The comparator 264 generates a signal 33 which is in turn fed to a monostable multivibrator 266 which can be re-triggered and has an unstable time of 3 seconds. The monostable multivibrator 266 generates a signal 34 which indicates a logic "1" while the audio signal 5 is supplied to the receiver 138'. The signal 34 is supplied to the second peripheral processing unit 114 to cause the same to read the vehicle code, which is stored in the latch circuit 254, by its rising edge.

In the following, communication from the traffic controller 156 to the vehicle driver will be described in connection with FIGS. 9 and 10. To begin with, it is assumed that (1) the vehicle code signal 17 and the inquiry from the vehicle, which were radiated and caught in a preceding limited communication area, have been already transferred to the peripheral processing unit 114 of FIG. 9, and (2) the message from the traffic controller 156 against this inquiry has been also transferred to and stored in the second peripheral processing unit 114 of FIG. 9. Now, under these conditions, the vehicle code is transferred to and stored in a 16-bit memory unit 268 which in turn supplies the same to the digital comparator 252. Following, when the vehicle enters the communication area defined by the antenna 102a of FIG. 9, the vehicle code signal 17 is supplied to the shift register 250 which in turn feeds the same to the digital comparator 252, wherein the new coming vehicle code is compared with the stored one. If the new coming vehicle code is identical with the stored one, a coincide signal 31 is generated from the digital comparator 252. The coincide signal 31 is fed to a monostable multivibrator 270, which has an unstable time of 0.09 sec, to cause the same to generate a transmission-start signal 35 therefrom. The signal 35 is then fed to a switch 272 to make the same open for 0.09 sec. On the other hand, the signal 35 is fed to an inverter 274 which closes the switch 226 for 0.09 sec by its output signal. Since the message of the traffic controller 156 against the inquiry has been transferred to the memory (not shown) of the transmitter 124', if the signal 31 is fed to the transmitter 124' as an instruction for reading the message in the memory, then the message in the memory is read in the compressed manner with respect to time as previously referred to. The compressed signal is denoted by reference numeral 36. The signal 36 is then used to frequency-modulate the UHF carrier (not shown). The signal 36 superimposed upon the carrier is denoted by reference numeral 37, wherein $f_{o2}$ is a center frequency, $f_{T2}$ is a carrier frequency, and $\Delta f_2$ is a maximum deviation from the carrier frequency $f_{T2}$. The signal 37 is fed to the antenna 102b through the switch 272 and the circulator 224. The antenna 102b then radiates the signal 37 into the communication area. The signal 37 thus radiated is received by the antenna 118 (FIG. 7) mounted in the vehicle 116 (FIG. 7) to be converted into the audible signal as previously described.

As shown in FIG. 9, the two antennas 102a and 102b are provided in the base station. In the following, the reason why the two antennas 102a and 102b are provided will be described. The antenna 102a should always radiate the communication area indicating signal 23 towards the road surface 103 (FIGS. 1 and 2), and on the other hand, the antenna 102b must be always ready for receiving both the vehicle code signal 17 and the message from the vehicle, and furthermore the antenna 102b is used to radiate the message from the base station to the vehicle. As a result, in order to avoid an undesirable possibility that the communication area indicating signal 23 may disturb the proper operation of the vehicle code detecting unit 231, it is necessary to individually provide the two antennas 102a and 102b.

Figure 11:
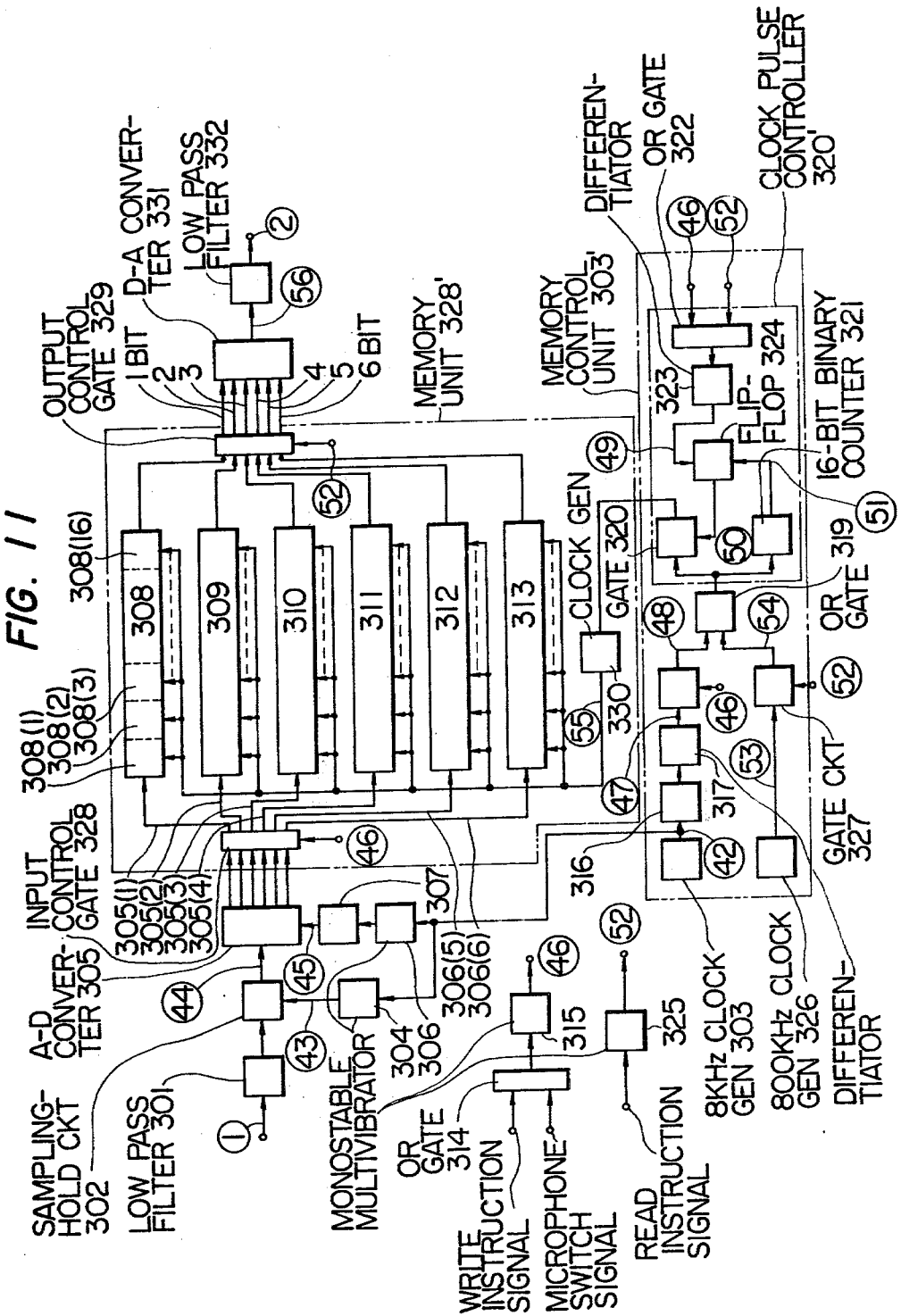
FIG. 11 is a detailed block diagram of a unit of FIG. 5.
Figure 12:
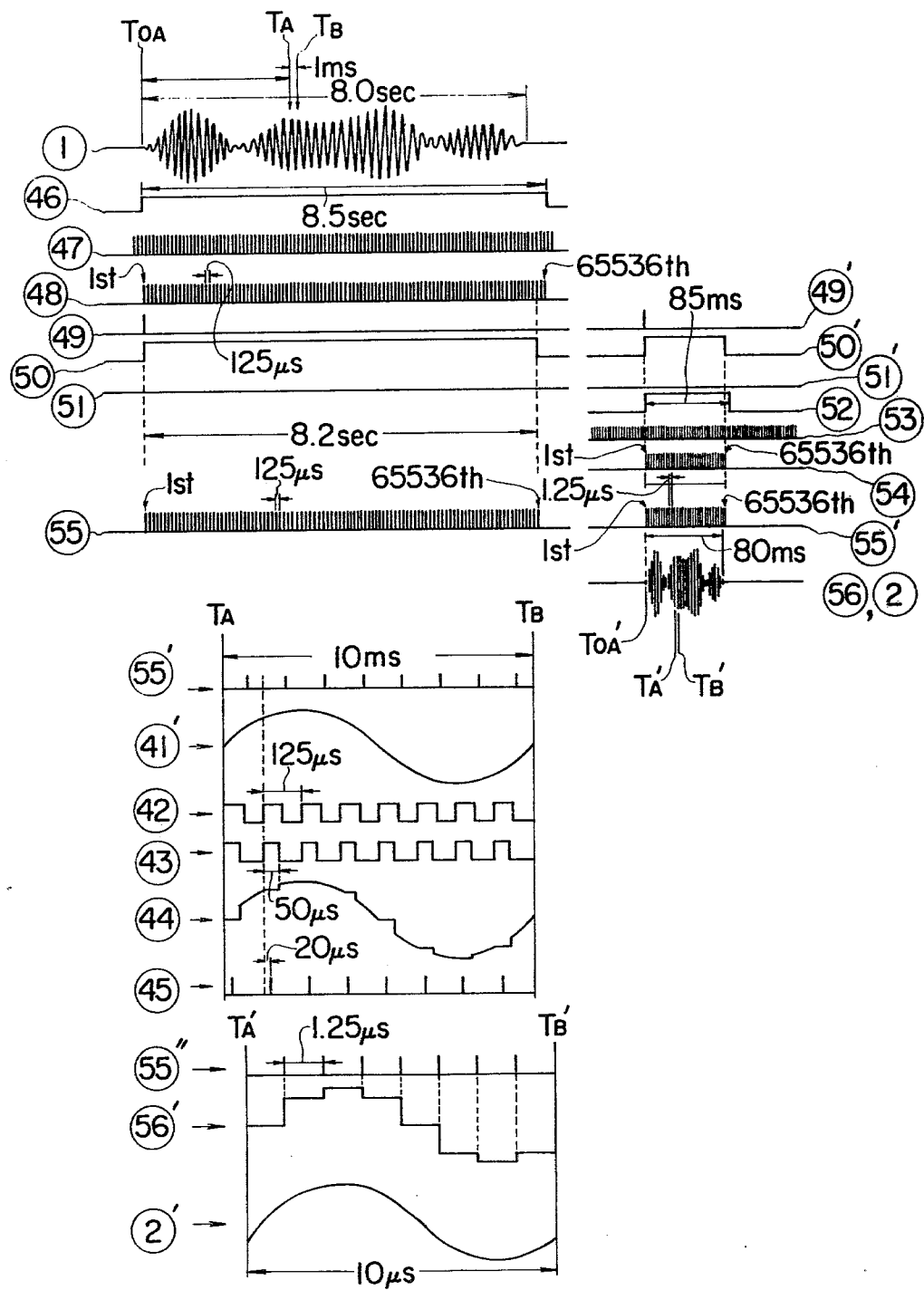
FIG. 12 is various wave forms appearing at various parts of the block diagram of FIG. 11.

Reference is now made to FIGS. 11 and 12, wherein FIG. 11 is a detailed block diagram of the converter 132 (FIG. 5) which compresses the incoming audio signal by one hundredth with respect to time and FIG. 12 is various wave forms appearing at various parts of the block diagram of FIG. 11. In FIG. 12, reference numerals $T_A$, $T_B$, $T_{OA}$, $T_A'$, $T_B'$, and $T_{OA}'$ each denotes a point of time, wherein a time period $T_{OA}-T_A$ is 100 times a time period $T_{OA}'-T_A'$. Wave forms 41' and 55' are enlargements of portions of the time period $T_A-T_B$ of signals 44 and 55, respectively, and wave forms 55", 56' and 2' are enlargements of portions of the time period $T_A'-T_B'$ of signals 55, 56 and 2.

The audio signal 1 from the audio amplifier 130 (FIG. 5) is fed to a low pass filter 301 which has an upper frequency limit of 2 kHz. The signal from the low pass filter 301 is fed to a sampling-hold circuit 302 to which a gate signal 43 is supplied from a monostable multivibrator 304. The gate signal 43 is generated as follows. A clock signal generator 303 of a memory control unit 303' generates a 8 kHz clock signal 42 to supply the monostable multivibrator 304 with the signal 42. The signal 42 triggers, at its rising edge, the monostable multivibrator 304 which has an unstable time of 50 μs, thus the signal 43 is produced. The signal from the low pass filter 301 is sampled in the sampling-hold circuit 302 in such a manner that an instantaneous value of the signal from the low pass filter 301 is maintained as long as the signal 43 indicates a logic "1". The signal from the sampling-hold circuit 302 is denoted by reference numeral 44 in FIG. 12. The signal 44 is then fed to an A-D converter 305 to which a conversion command signal 45 is supplied from a differentiator 307. The signal 45 is generated as follows. The signal 42 from the clock signal generator 303 is fed to a monostable multivibrator 306 with an unstable time of 20 μs, triggering the monostable multivibrator 306 by its rising edge. A signal (not shown) from the multivibrator 306 is then fed to the differentiator 307 to be differentiated thereat. The signal 45 is a train of pulses each of which is generated by differentiating the falling edge of the signal from the monostable multivibrator 306. The pulse width of the signal 45 is about 0.1 μs. Thus, the A-D converter 305 receives the signal from the sampling-hold circuit 302 and also the signal 45 to generate 6-bit digital signal at its 6 output terminals 305(1)-305(6). The 6 bit signal from the A-D converter 305 is then fed to an input control unit 328 of a memory unit 328' which permits this signal to pass therethrough for 8.5 seconds under the control of a signal 46. The signal 46 is generated as follows. Two signals are fed to an OR gate 134, one of which two signals is the write-instruction signal from the second peripheral unit 114 to the transmitter 124' (FIG. 4) and other is the signal indicative of the closing of the microphone switch 134 (not shown in FIG. 11). The output of the OR gate 134 is then fed to a monostable multivibrator 315 which has an unstable time of 8.5 seconds. The output of the monostable multivibrator 315 is the signal 46.

The memory unit 328' comprises the input control unit 328, an output control unit 329 and six shift registers 308-313. Each of the shift registers 308-313 is provided with 16 IC (integrated circuit) memories arranged in series, for example, 308(1)-308(16). The IC memory is for example a 4906-bit MOS (metal oxide semiconductor) memory of static type. Each of the memories is connected to a clock signal supply line 330' which is connected to a clock signal generator 330. As shown, all of the right ends of the shift registers 308-313 are connected to the output control unit 329. It is understood from the above that each of the shift registers 308-313 has 65,536 (=$2^{16}$) bits. As shown, the output terminals 305(1)-305(6) of the input control unit 328 are connected to the shift registers 308-313, respectively. The binary signals fed to the shift registers 308-315 are shifted rightwards therewithin under the control of clock pulses generator 330.

In the following there will be described in detail the arrangement and function of the memory control unit 303'. The 8 kHz clock signal from the clock signal generator 303 is fed to a monostable multivibrator 316 with a stable time of 60 μs, triggering the same by its rising edge to generate a train of pulses therefrom. The signal from the monostable multivibrator 316 is then fed to an differentiator 317 which generates a signal 47 by differentiating the falling edge of the signal supplied. The signal 47 is then fed to a gate circuit 318 to which the signal 46 is also supplied. The gate circuit 318 allows the signal 47 to pass therethrough only while the signal 46 indicates a logic "1" to generate the signal 48. The signal 48 is then fed to an OR gate 319 to which a signal 54 is also supplied from a gate circuit 327. A detail of the signal 54 will be described later. The signal 48 is fed through the OR gate 319 to a gate circuit 320 of a clock pulse controller 320'. In the meanwhile, the signal 46 from the monostable multivibrator 315 is fed to a differentiator 323 through an OR gate 322. The differentiator 323 differentiates the rising edge of the signal 46 to generate a signal 49 which sets a flip-flop circuit 324. Thus, the flip-flop 324 generates a signal 50 which is fed to the gate circuit 320. The gate circuit 320 allows the signal 48 to pass therethrough to supply the same to the clock pulse generator 330. The clock pulse generator 330 then generates the clock signal 55 as long as the flip-flop 324 is set. On the other hand, the signal 48 is fed, through the OR gate 319, to a 16-bit binary counter 321 which counts the number of the pulses from the OR gate 319 to generate a signal 51 when the number of the counted pulses reaches 65,536 ($=2^{16}$). The signal 51 is used to reset the flip-flop 324, thereby to prohibit the gate 320 from allowing to pass the signal 48 therethrough. This means that the clock signal generator 330 stops generating the clock signal 55 to stop writing the signal from the input control gate 328 into the shift registers 308-313. In the above, it is understood that, when the flip-flop 324 is reset, the digital signal firstly transferred to one of the shift registers 308-313 from the input control unit 328 has been shifted to one of the six rightest ends of the IC memories. This means that the audio signal from the low pass filter 301 for 8 seconds is completely stored in the digital form in the shift registers 308-313. More detail, as the frequency of the signal 48 is 8 kHz, then the time for the binary counter 321 to count the 65,536 pulses is about 8.19 seconds. Therefore, it is sure that the signal from the low pass filter 301 for 8 seconds is completely stored in the shift registers 308-313 without fail.

In the following, how the audio signal stored in the memory unit 328' is read out will be described in connection with FIGS. 11 and 12. When the signal 12 (FIG. 7) or the signal 31 (FIG. 9) is supplied through an input terminal 325' to a monostable multivibrator 325 with an unstable time of 85 ms, the signal in question triggers the multivibrator 325 at its rising edge to cause the same to generate a signal 52 with a pulse width of 85 ms. The signal 52 is fed to a gate circuit 327 to allow the same to pass therethrough a 800 kHz clock signal for 85 ms from a clock pulse generator 326, when the signal 52 indicates a logic "1". The signal from the gate circuit 327 is denoted by the reference numeral 54. On the other hand, the signal 52 is fed to the differentiator 323 through the OR gate 322. The differentiator 323 generates a signal 49' resembling the signal 49 by differentiating the rising edge of the signal 52. The output of the differentiator 323 is used to set the flip-flop 324, the output of which is a signal 50' resembling the signal 50 and opens the gate circuit 320 like the same manner as referred to in the above. Whilst, the signal 54 from the gate circuit 327 is fed to the 16-bit binary counter 321 through the OR gate 319. The counter 321 counts the number of the pulses supplied thereto to generate a signal 51', which resembles the signal 51, when the number of the counted pulses reaches 65,536 ($=2^{16}$). The output of the counter 321 resets the flip-flop 324 in order to prohibit the gate circuit 320 from allowing to pass the signal 54 therethrough, thereby to stop generating a clock signal 55' corresponding to the clock signal 55. On the other hand, the signal 52 is fed to the output control gate 329 to control the same in such a manner as to allow the signal from the shift registers 308-313 to pass the output control gate 329 while indicating a logic "1". The digital signal passing through the output control gate 329 is fed to a D-A converter 331 to be converted into an analog signal 56 corresponding thereto. The signal 56 is then fed to a low pass filter 332, which has an upper frequency limit of 200 kHz, in order to remove undesirable signal components with the frequencies of the clock signal 55. The wave form of the output of the low pass filter 332 is denoted by reference numeral 57 and 57'.

In the above, it is readily understood that, since the oscillatory frequency (800 kHz) of the generator 326 is one hundred times that (8 kHz) of the generator 303, a signal 2 from the low pass filter 332 is compressed by one hundredth with respect to time as compared with the signal 1.

Figure 13:
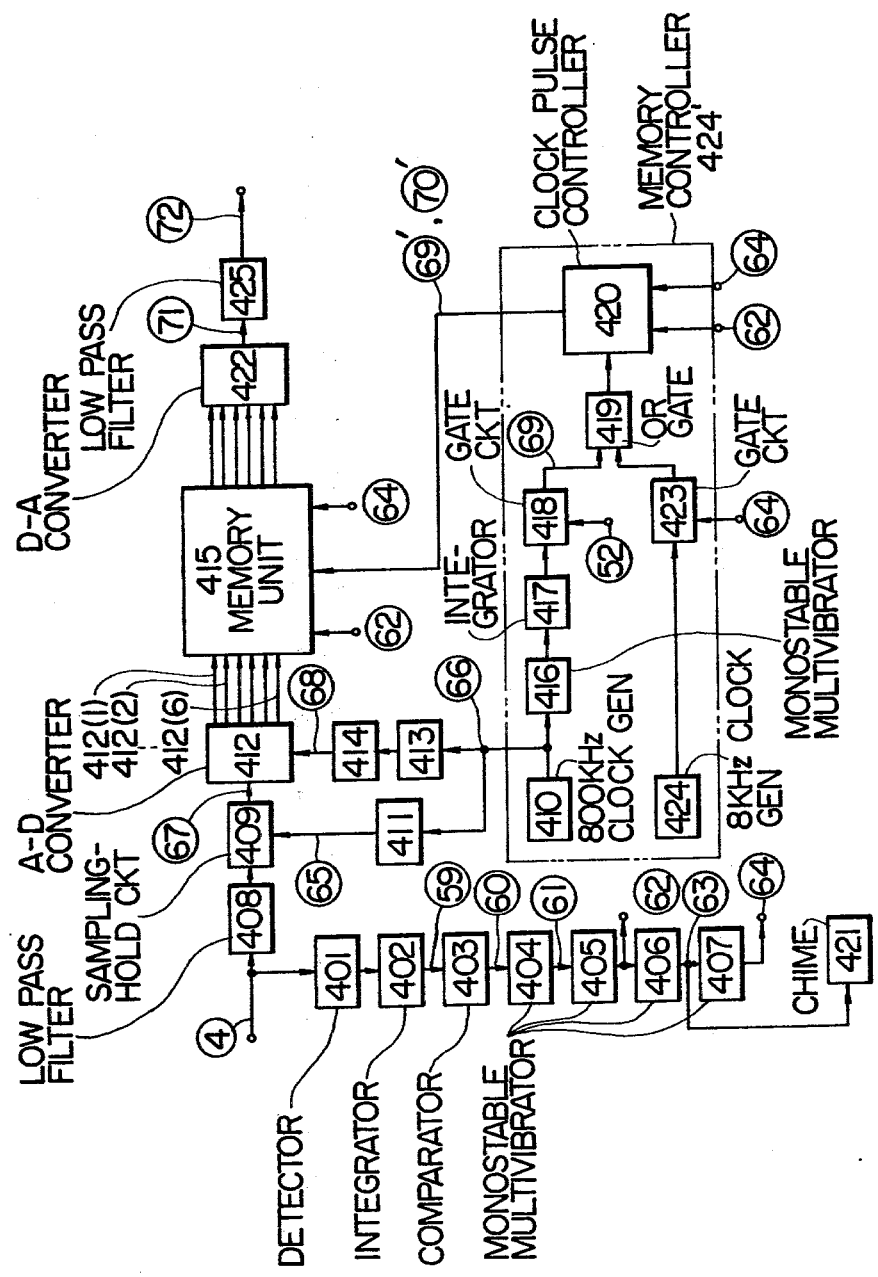
FIG. 13 is a detailed block diagram of a unit of FIG. 5.
Figure 14:
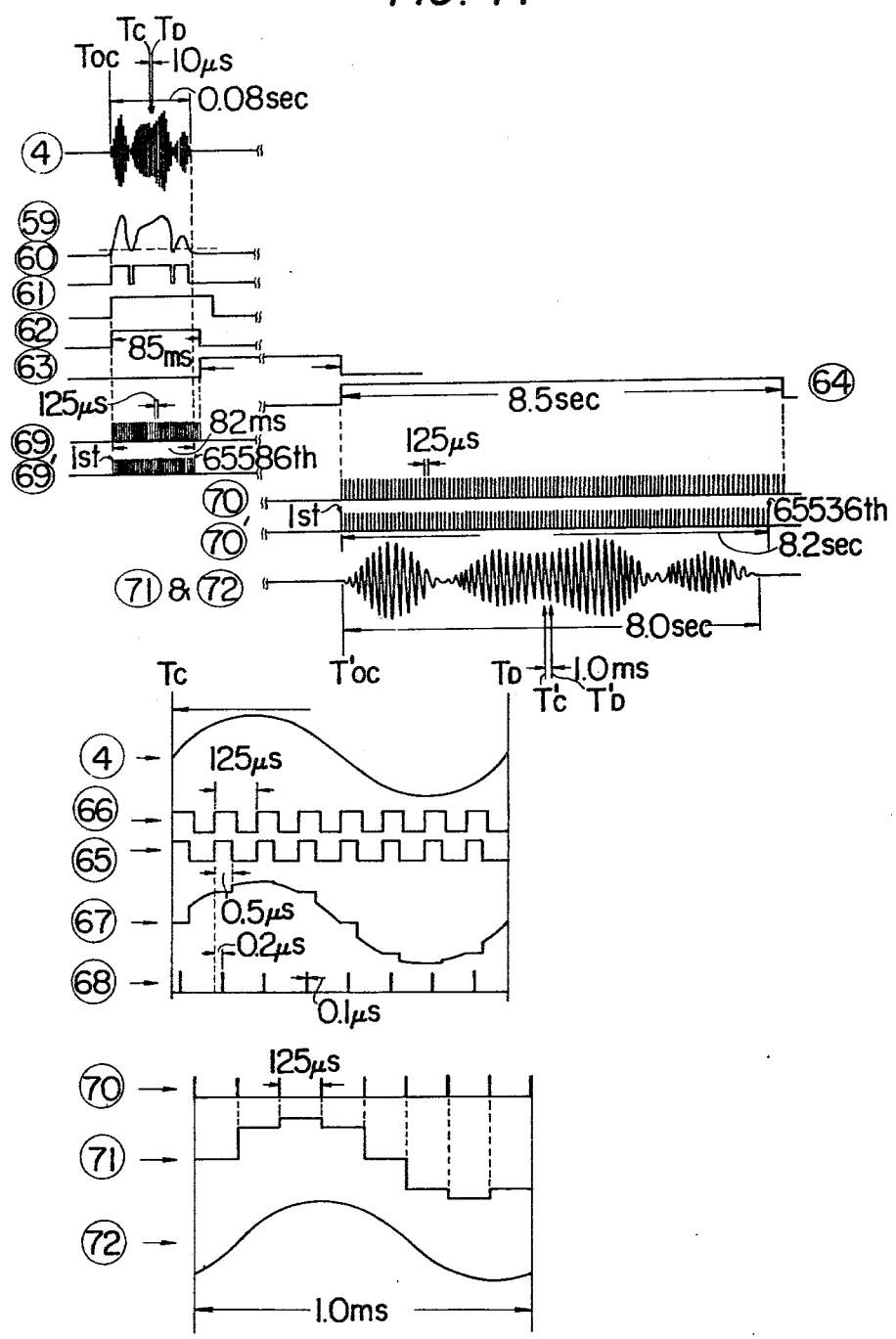
FIG. 14 is various wave forms appearing at various parts of the block diagram of FIG. 13.

Reference is now made to FIGS. 13 and 14, wherein FIG. 13 is a detailed block diagram of the converter 150 (FIG. 5) wherein the audio signal is read from the memory 100 times faster than it is written into the same, and FIG. 14 is various wave forms appearing at various parts of the block diagram of FIG. 13. In FIG. 14, reference numerals $T_C$, $T_D$, $T_{OC}$, $T_C'$, $T_D'$ and $T_{OC}'$ each denotes a point of time, wherein a time period $T_{OC}-T_C$ is one hundredth of a time period $T_{OC}'-T_C'$. A wave form 4' is an enlargement of a portion of the time period $T_C-T_D$ of the signal 4, and wave forms 77'', 71' and 72' are enlargements of portions of the time period $T_C'-T_D'$ of signals 70', 71 and 72.

The compressed audio signal 4 from the discriminator 146 is fed to an audio signal detector 401 of the converter 150. The detector 401 generates a full-wave rectified and compressed audio signal (not shown) which is then fed to an integrator 402 with a time constant of 1 ms to be smoothed thereat. The signal from the integrator 402 is denoted by reference numeral 59. The signal 59 is fed to a comparator 403, which has a predetermined threshold value and generates a signal 60 with rectangular waves as shown in FIG. 14. The signal 60 is then fed to a monostable multivibrator 404 which can be re-triggered and has an unstable time of 20 ms. The multivibrator 404 generates a signal 61 which indicates a logic "1" at least while the compressed audio signal 4 exists. The signal 61 is fed to a monostable multivibrator 405 with an unstable time 85 ms, triggering the same by its rising edge. The monostable multivibrator 405 generates a signal 62 with a pulse width of 85 ms which is used as a write control signal as is described later. The signal 62 is then fed to a monostable multivibrator 406 with an unstable time of 3 seconds, triggering the same by its falling edge, whereby the monostable multivibrator 406 generates a chime signal 63. The chime signal 63 is fed to a suitable means for making alert the traffic controller, for example. The chime signal 63 will be described in detail later. The signal 63 is fed to a monostable multivibrator 407 with an unstable time of 8.5 seconds, causing the same to generate a read control signal 64 therefrom.

On the other hand, the compressed audio signal 4 is fed to a low pass filter 408 which has an upper frequency limit of approximately 200 kHz, and which consequently passes only the compressed signal within this frequency range. The output of the low pass filter 408 is applied to a sampling-hold circuit 409 which corresponds to the sampling-circuit 302 (FIG. 11). As shown in FIG. 13, a gate signal 65 is fed to the sampling-hold circuit 409 from a monostable multivibrator 411. The gate signal 65 is generated as follows. A clock signal generator 410 generates a 800 kHz clock signal 66 which is fed to the monostable multivibrator 411 with an stable time of 0.5 μs to trigger the same by its rising edge. The output of the monostable multivibrator 411 is the gate signal 65. The signal from the low pass filter 408 is sampled in the sampling-hold circuit 409 in such a manner that an instantaneous value of the signal from the low pass filter 408 is maintained as long as the signal 65 indicates a logic "1". The signal from the sampling-hold circuit 409 is denoted by reference numeral 67 in FIG. 14. The signal 67 is then fed to an A-D converter 412 to which a conversion command signal 68 is supplied from a differentiator 414. The signal 68 is generated as follows. The signal 66 from the clock signal generator 410 is fed to a monostable multivibrator 413 with an unstable time of 0.2 μs, triggering the monostable multivibrator 413 by its rising edge. A signal (not shown) from the multivibrator 413 is then fed to the differentiator 414 to be differentiated thereat. The signal 68 is a train of pulses each of which is generated by differentiating the falling edge of the signal from the monostable multivibrator 413. A pulse width of each of the pulses of the signal 68 is about 0.1 μs. Thus, the A-D converter 412 receives the signal from the sampling-hold circuit 409 and also the signal 68, generating 6-bit digital signal at its 6 output terminals 412(1)–412(6). The 6-bit signal from the A-D converter 412 is then fed to a memory unit 415. The memory unit 415 corresponds to the memory unit 328', and their arrangements and functions are similar, so that there will be a simple description thereof.

In the following, there will be described the arrangement and function of a memory controller 424' which corresponds to the memory controller 303' in FIG. 11. The 800 kHz clock signal from the clock signal generator 410 is fed to a monostable multivibrator 416 with an unstable time of 0.6 μs, triggering the same by its rising edge to generate a train of pulses therefrom. The signal from the multivibrator 416 is then fed to a differentiator 417 which generates a signal (not shown) by differentiating the falling edge of the signal applied thereto. The output of the differentiator 417 is then fed to a gate circuit 418 to which the signal 62 is fed from the monostable multivibrator 405. The gate circuit 418 allows the signal from the differentiator 417 to pass therethrough only while the signal 62 indicates a logic "1", that is, for a time period of 85 ms. The pulses passing through the gate circuit 418 are illustrated by reference numeral 69. The signal 69 is fed to a clock pulse controller 420 which corresponds to the clock pulse controller 320'. From the clock pulse counter 420, a signal 69' which involves 65,536 pulses is fed to the memory unit 415 in the same manner as in FIG. 11. The signal 69' is equal to the signal 55 (FIGS. 11 and 12) with the exception that the former is one hundredth of the latter with respect to time. Due to the signal 69', the memory unit 415 completes writing of the binary signal from the A-D converter 412. In the above, the signal 62, which is fed to the clock pulse counter 420, controls the generation of the signal 69' just as referred to in conjunction with the clock pulse counter 320' in FIG. 11.

In the following, how the audio signal stored in the memory unit 415 is read will be described in connection with FIGS. 13 and 14. Upon completion of the writing of the binary signal from the A-D signal converter 412 into the memory 415, that is, on the instant the signal 62 indicates again a logic "0" after 85 ms, the chime signal 63 is generated and is fed to a suitable alerting means 421 such as a chime, energizing the same for indicating that the message will follow. The output control signal 64 is then generated immediately after the chime signal 63 indicates a logic "0", in that the monostable multivibrator 407 is triffered by the falling edge of the chime signal 63. The output control signal 64 is fed to an output control gate (not shown) provided in the memory unit 415 in order to open the same for 8.5 seconds, which output control gate corresponds to the output control gate 329 in FIG. 11. On the other hand, the control signal 64 is fed to a gate circuit 423 to open the same for passing therethrough for 8.5 seconds a 8 kHz clock signal from a 8 kHz clock signal generator 424. A train of pulses passing through the gate circuit 423 is denoted by reference numeral 70. The signal 70 is fed to the clock counter 420 through the OR gate 419, thus causing the clock counter 420 to generate a signal 70' therefrom. The manner of the generation of the signal 70' is equal to that described in conjunction with FIG. 11, so that further description thereof will be omitted for brevity. The signal 70' is used to read the stored audio signal from the memory unit 415 one hundred times slower than it is written into the memory 415. The digital signal thus read from the memory 415 is then fed to a D-A converter 422, which corresponds to the D-A converter 331 in FIG. 11, to be converted into an analog signal 71. The signal 71 is then fed to a low pass filter 425, which has an upper frequency limit of 2 kHz, in order to remove undesirable signal components with the frequencies of the clock signal 70'. The wave form of the output of the low pass filter 425 is denoted by reference numeral 72 and 72'.

In the above, it is readily understood that, since the oscillatory frequency (8 kHz) of the generator 424 is one hundredth of that (800 kHz) of the generator 410, a signal 72 from the memory 415 is enlarged one hundred times with respect to time as compared with the signal 4.

Figure 15:
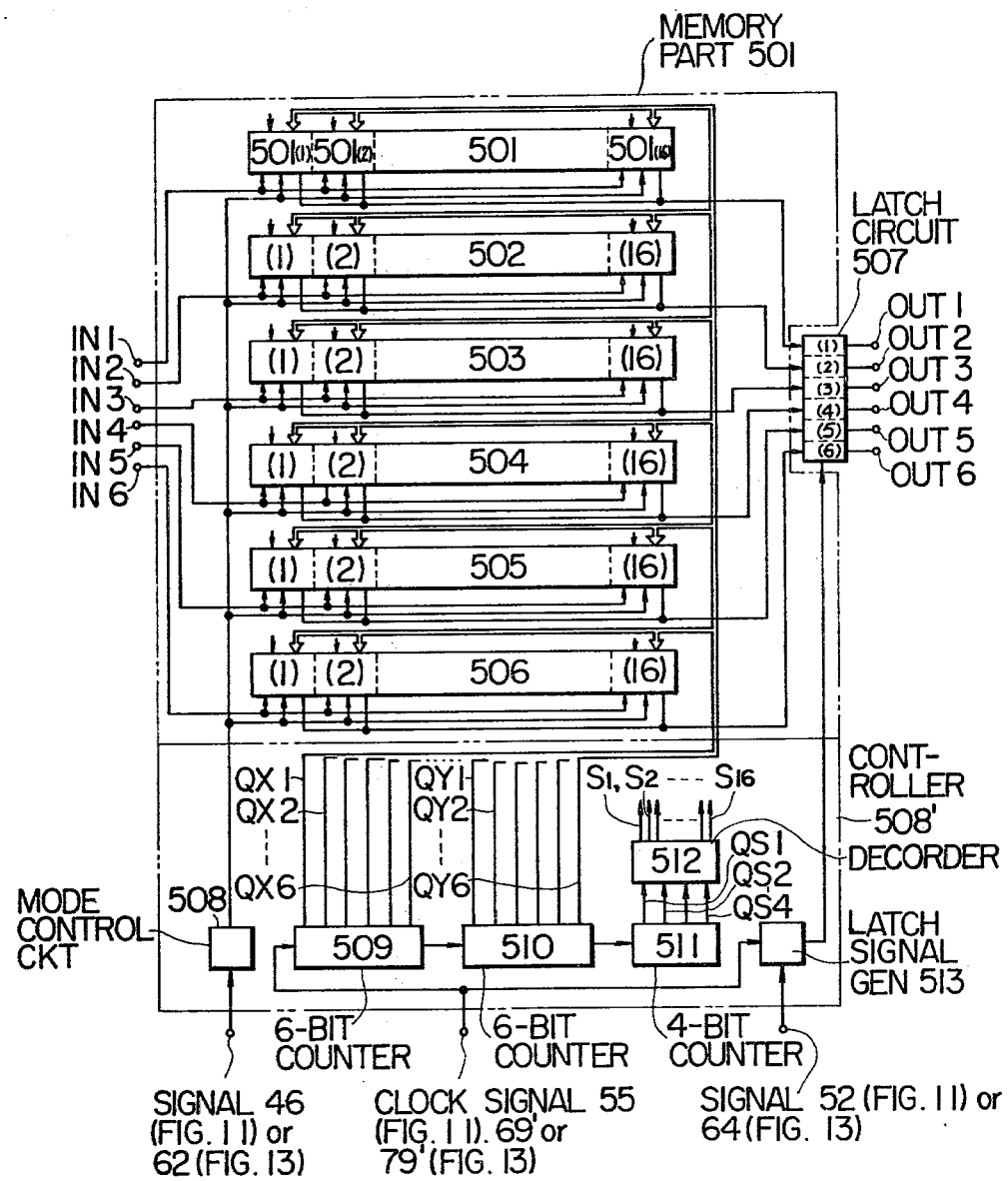
FIG. 15 is a block diagram of an example of a randum access memory unit which can be used in the embodiments of the present invention.

Referring to FIG. 15, which is a block diagram illustrating an example of a randum access memory unit which can be replaced for the memory unit 328' in FIG. 11 or 415 in FIG. 13. The randum access memory unit comprises a memory part 501 including six memory elements 501–506, a latch circuit 507 and a controller 508'. The memory element 501 includes 16 randum access MOS IC memory chips of static type 501(1)–501(16). This applies to each of the other memory elements 502–506 as best seen from the drawing. The capacity of each of the memory chips is 4,096 bits, so that each of the memory elements 501–506 has 65,536 ($=2^{16}$) bits. Six input terminals IN1–IN6 are connected to the memory chips in such a manner that the input terminal IN1 is connected to the memory chips 501(1)–501(16) through their input terminal (no numeral), and the input terminal IN2 to the memory chips 502(1)–502(16), etc. On the other hand, all the memory chips of the memory elements 501–506 are connected to either of output terminals OUT1–OUT6 through respectively associated latch elements 507(1)–507(6) in such a manner that the memory chips 501(1)–501(16) are connected to the output terminal OUT1 through the latch element 507(1), and the memory chips 502(1)-502(16) are connected to the output terminal OUT2 through the latch element 507(2), etc. A mode control circuit 508 of the controller 508' receives the write control signal 46 (FIG. 11) or 62 (FIG. 13) to generate a mode signal which is fed to all of the memory chips 501(1)-501(16) in order to allow the memory chips to write the information from the input terminals IN1-IN6. The write clock signals 55 (FIG. 11) or 69' (FIG. 13), which contains 65,536 clock pulses, is fed to a 6-bit counter 509 of the controller 508'. The 6-bit counter 509 generates six-digit (QX1-QX6) binary number which indicates X-address. A so-called "Carry" signal from the counter 509 is fed to another 6-bit counter 510 which generates six-digit (QY1-QY6) binary number indicating Y-address. The two 6-digit binary number from the counter 509 and 510 are fed to each of the memory chips 501(1)-501(16) through 12 address bus lines (no numerals) to allocate an address into which an information is written or from which the written information is read. A "Carry" signal from the counter 510 is then fed to a 4-bit counter 511 which generates a 4-digit (QS1-QS4) binary number. The 4-bit binary number from the counter 511 is fed to a decorder 512 which, then, generates 16 signals at its 16 conducting lines S1-S16. These 16 signals firstly select one of the 16 memory chips of the memory element 501 in order of the reference numerals 501(1)-501(16), and, then, to sequentially select one of the 16 memory chips of each of the memory elements 502-506 in order of the reference numeral in accordance with the number of the clock pulses applied to the counter 509. The clock signal is also fed to a latch signal generator 513 to which the read control signal 52 (FIG. 11) or 64 (FIG. 13) is also applied. The latch signal generator 513 generates a latch signal. The latch signal is used to latch the information at the latch elements 507(1)-507(6), respectively, which information has read from the memory elements 501-506. The information latched in the form of binary in the latch elements 507(1)-507(6) is then transferred to the D-A converter 331 (FIG. 11) or 422 (FIG. 13) through the output terminals OUT1-OUT6.

Figure 16:
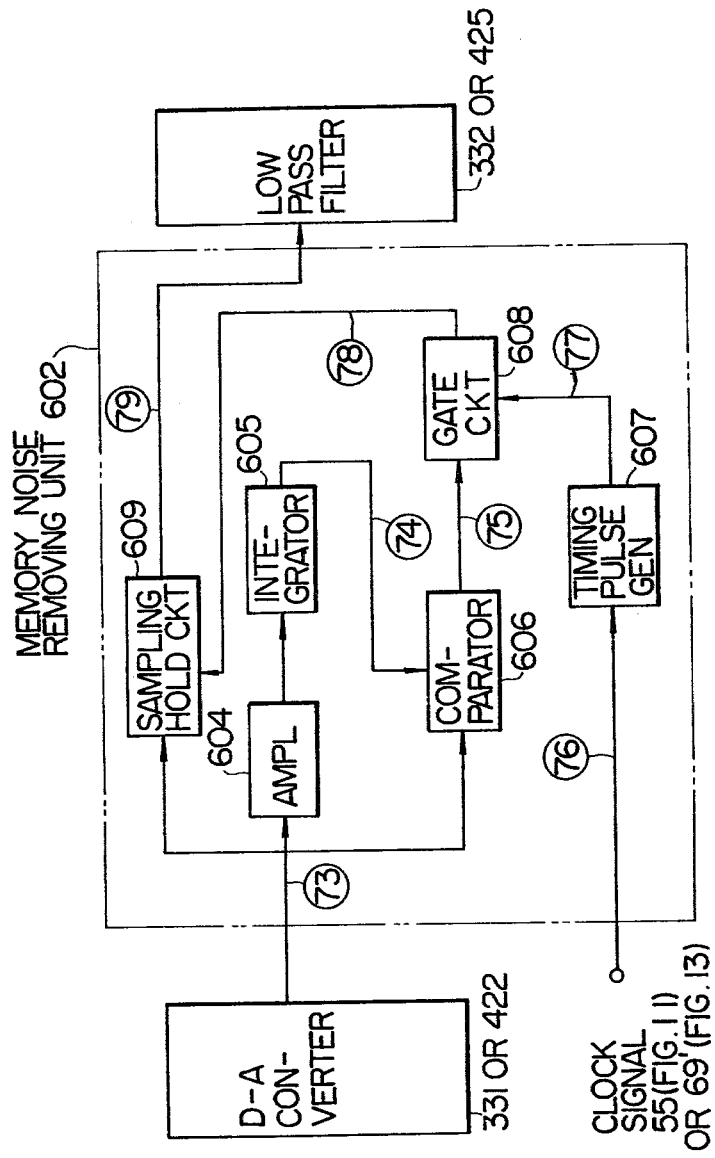
FIG. 16 is a block diagram of a noise removing unit used in embodiments of the present invention.

An important feature of FIG. 16 is that the vehicle driver can repeatedly reproduce the information stored in the memory. This is because a semiconductive random access memory is of a so-called "nondestructive read" type.

The functions of the randum access memory of FIG. 15 are well known in the art, so that further description thereof will be omitted.

Figure 17:
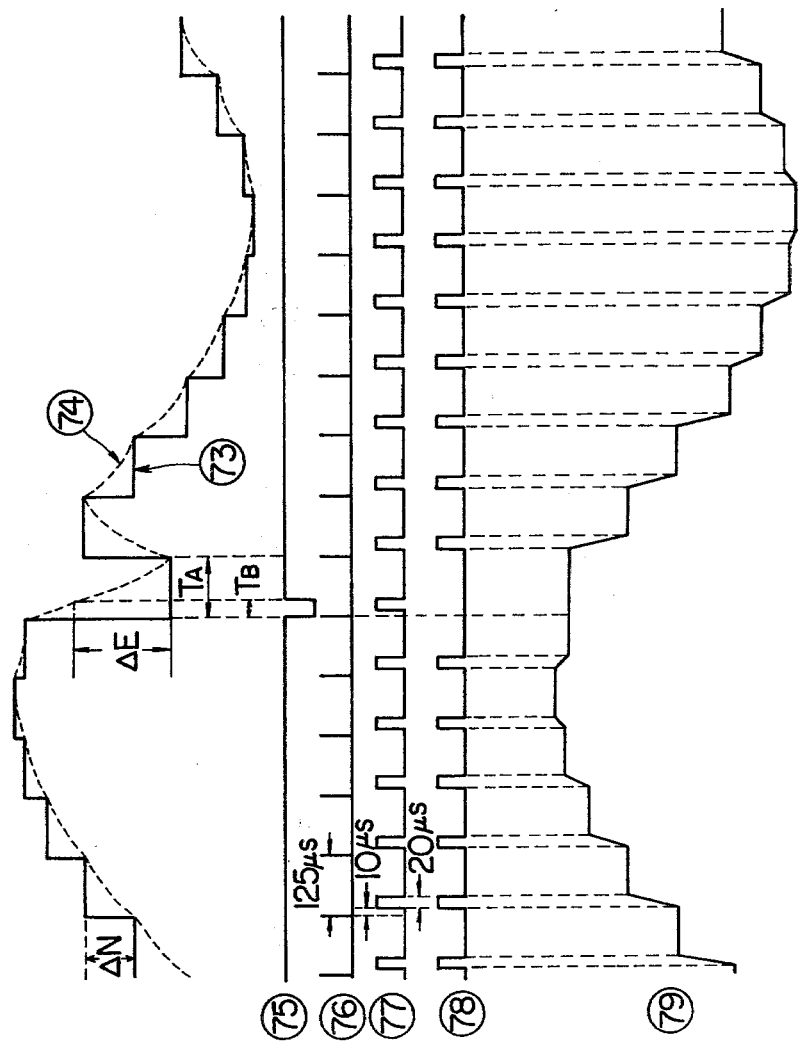
FIG. 17 is various wave forms appearing at various parts of the block diagram of FIG. 16.
Figure 18:
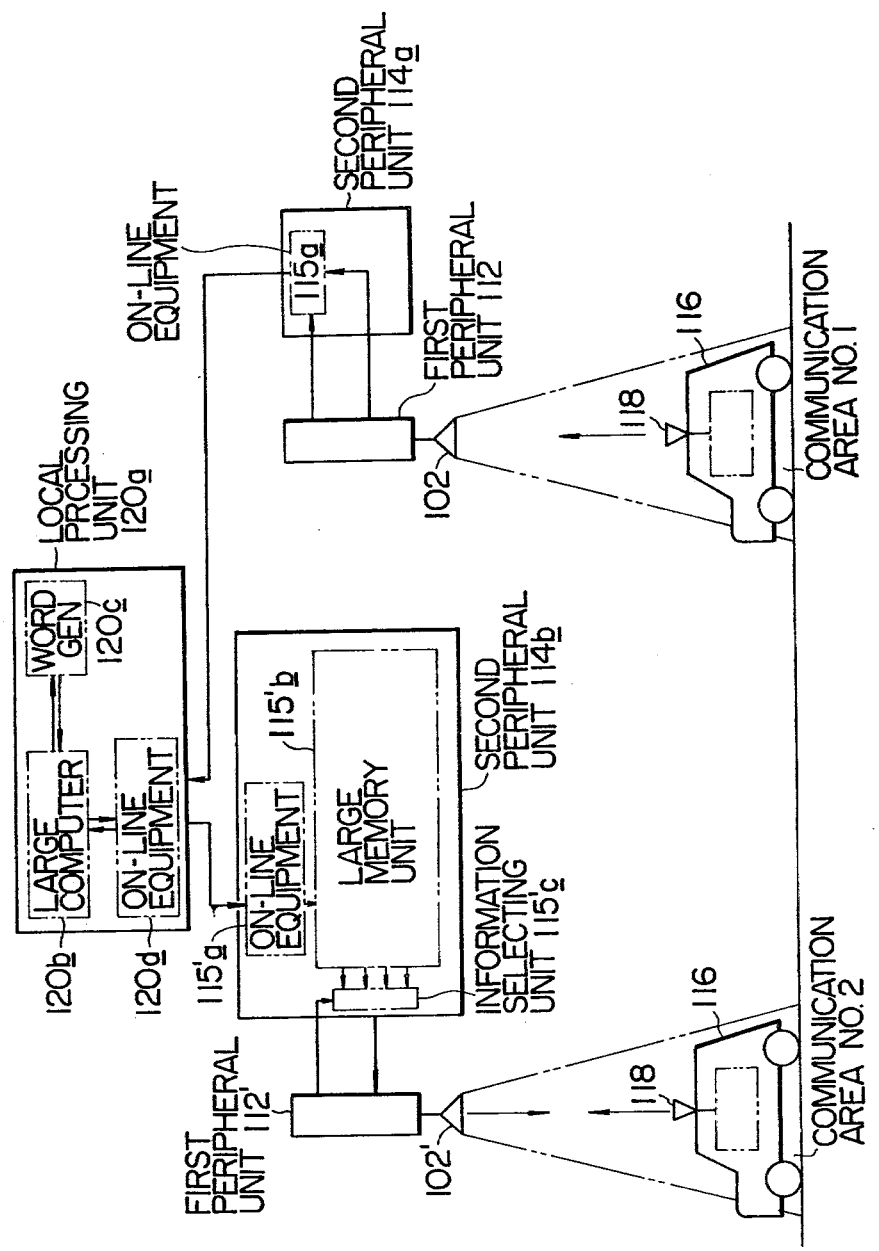
FIG. 18 is another embodiment of the present invention.

Reference is now made to FIGS. 16 and 17, wherein FIG. 16 is a block diagram illustrating a memory noise removing unit 602 according to the present invention, which unit 602 is interposed between the D-A conterter 331 and the low pass filter 332 in FIG. 11 or between the D-A converter 422 and the low pass filter 425 in FIG. 13, and, on the other hand, FIG. 17 is various wave forms appearing at various parts of the block diagram of FIG. 16.

The memory noise removing unit 602, in brief, is to remove noise which results from a partial trouble or defect of the memory element of, for example, FIG. 15, thereby to improve a signal-to-noise ratio of the signal fed to the low pass filter 332 in FIG. 11 or 425 in FIG. 13.

A signal 73, which corresponds to the signal 56 in FIG. 11 or the signal 71 in FIG. 13, is fed to a buffer amplifier 604 from the D-A converter 331 or 422. The output of the buffer amplifier 604 is then fed to an integrator 605 which has a time constant of 0.05 seconds and which generates a signal 74. The signal 74 is fed to a comparator 606 to which the signal 73 is also applied. The comparator 606 compares the magnitudes of the two signals 73 and 74 to generate a signal 75 which indicates a logic "0" when the difference between the magnitudes exceeds a predetermined value $\Delta E$, and otherwise, indicates a logic "1". It is necessary in the above that the predetermined value $\Delta E$ should be larger than a maximum value between a value of a normal signal from the D-A converter 331 and its integrated value, for example, $\Delta N$ as shown in FIG. 17. A read control signal 76, which corresponds to the clock signal 55 in FIG. 11 or 69' in FIG. 13, is fed to a timing pulse generator 607 which consists of a monostable multivibrator and a differentiator (both not shown). The timing pulse generator 607 generates a signal 77 which is fed to a gate circuit 608. The gate circuit 608 passes the signal 77 only while the signal 75 indicates a logic "1". The output of the gate circuit 608 is indicated by reference numeral 78 and fed to a sampling-hold circuit 609 as a gate signal. The sampling-hold circuit 609 receives the signal 73 to pass the same only while the signal 78 indicates a logic "1", and holds an instantaneous value of the signal 73 at a time point that the signal 78 turns to a logic "0", until the signal 78 again indicates a logic "1", the manner of which is shown in FIG. 17.

With this arrangement, when the signal from the D-A converter 331 or 442 has a portion which does not indicate a proper value for a time period $T_A$ due to the partial trouble or defect of the memory element, the signal 75 indicates a logic "0" for a time period $T_B$ in that the difference between the magnitudes of the signals 73 and 74 exceeds the predetermined value $\Delta E$ for that time period. Thus, a pulse of the signal 77, which corresponds to the logic "0" of the signal 75, is not transferred through the gate circuit 608. As a consequence, the signal 78 from the gage circuit 608 lacks one pulse in comparison with the signal 77. Therefore, the output of the sampling-hold circuit 609 becomes as shown by the reference number 79 in FIG. 17.

It is understood from the foregoing that partial trouble or defect of the memory element of FIG. 11 or 13 does not adversely affect the reproduced voice if the memory noise removing unit 602 is employed in the systems of FIGS. 11 and 13.

Returning to FIG. 4, wherein the inquiry of the vehicle driver 126 is converted into an electrical audio signal which is then compressed at a predetermined rate with respect to time to be radiated from the UHF antenna 118 when the vehicle reaches the limited communication area No. 1. The radiated signal containing the inquiry is fed to the receiver 138' of the ground station, being stored therein, and then being read from the receiver 138' at a speed slower than it is written into the same, so that the electrical signal before the compression can be obtained. Furthermore, the message of the traffic controller 156 against the inquiry is transferred to the vehicle driver 126 by like the above processes as previously described in detail.

It is therefore understood that, in accordance with the system of FIG. 4, a quick response against the inquiry of the vehicle driver cannot be attained, since the traffic controller should listen to the reproduced inquiry, then, understand it, and speak into the microphone (not shown) to answer the inquiry.

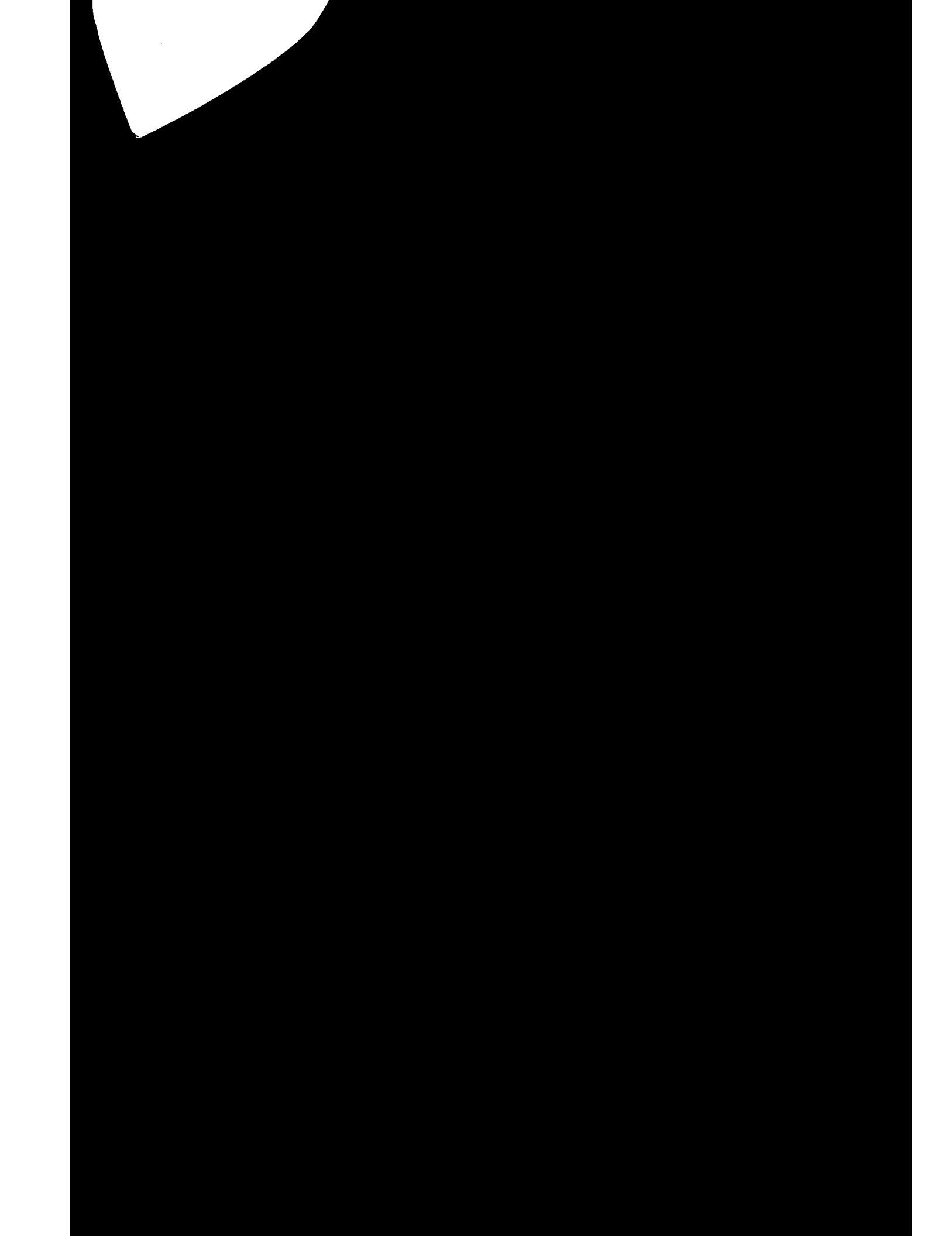

UHF antenna to radiate the vehicle code signal therefrom.

3. A system claimed in claim 2, wherein said communication area indicating signal generator comprises, a first signal generator (214, FIG. 9) generating a signal indicative of the limited communication area, a normally open gate (216) connected to said first signal generator for allowing the signal to pass therethrough until said peripheral unit receives said vehicle code signal, a modulator (218) connected to said normally open gate, a second signal generator (222) generating a UHF carrier therefrom, an isolator (220) interposed between said second generator and said modulator said modulator modulating said UHF carrier by said signal indicative of the limited communication area, and the modulated UHF signal being transferred to said first UHF antenna.

4. A system as claimed in claim 3, wherein the signal from said first signal generator is a 100 kHz square wave signal, and said modulator is a pulse modulator.

5. A system as claimed in claim 2, wherein said vehicle code detector comprises: a detector (230) connected to said first UHF antenna and detecting said vehicle code signal; a shift register (250) connected to said detector, sequentially receiving said vehicle code, shifting said vehicle code in synchronism with clock pulses from a clock pulse generator connected to said shift register, and generating said vehicle code in the parallel form; a memory device (268) storing another vehicle code therein; and a digital comparator (252) connected to both said shift register and said memory device, receiving said two vehicle codes to compare the same, and generating a coincidence signal (31) when the two vehicle codes are identical with each other.

6. A system as claimed in claim 3, wherein said communication area detector comprises: a detector (164, FIG. 7) connected to said second UHF antenna and detecting said signal indicative of the limited communication area; a rectifier (168) connected to said detector and rectifying the detected signal; and integrator (170) connected to said rectifier and integrating the output of the rectifier; a comparator (174) comparing the output of said integrator with a predetermined value, and generating a step-like signal (10); and a monostable multivibrator (176) connected to said comparator receiving said step-like signal, and being triggered thereby to generate a signal with a predetermined unstable time which signal indicates that the vehicle enters the limited communication area.

7. A system as claimed in claim 1, wherein the compressing means of said transmitter includes: a sampling-hold circuit (302) for sampling the electrical audio signal from said audio means to hold an instantaneous value thereof for a predetermined time period in response to one of gate pulses (43) applied thereto; an analog-to-digital converter (305) connected to said sampling-hold circuit to convert the output thereof into a corresponding digital signal; a memory unit (328') connected to said analog-to-digital converter to store the output thereof in accordance with a clock signal (55) applied thereto and to emit the stored signal therefrom, in accordance with another clock signal applied thereto, faster than it is stored; and a digital-to-analog converter (331) connected to said memory unit to convert the output thereof into a corresponding analog signal.

8. A system as claimed in claim 1, wherein the reproducing means of said receiver includes: a sampling-hold circuit (409) for sampling the compressed audio signal from the detecting means of said receiver to hold an instantaneous value thereof for a predetermined time period in response to one of gate pulses (65) applied thereto; an analog-to-digital converter (412) connected to said sampling-hold circuit to convert the output thereof into a corresponding digital signal; a memory unit (415) connected to said analog-to-digital converter to store the output thereof in accordance with a clock signal (69') applied thereto and to emit the stored signal therefrom, in accordance with another clock signal (70') applied thereto, slower than it is stored; and a digital-to-analog converter (422) connected to said memory unit to convert the output thereof into a corresponding analog signal.

9. A system as claimed in claim 7, wherein said transmitter further comprises a memory noise removing means (602) which is connected to the digital-to-analog converter to remove noise resulting from partial trouble of said memory unit, which memory noise removing means includes:

a buffer amplifier (604) connected to the digital-to-analog converter receiving the analog signal therefrom;

an integrator (605) connected to said buffer amplifier to integrate the output thereof;

a comparator (606) connected to both said digital-to-analog converter and said integrator, comparing the magnitudes of the outputs of the sames to generate one logic indication when the difference between the magnitudes exceeds a predetermined value, and, otherwise, to generate the other logic indication;

a timing pulse generator (607) receiving said another clock signal to generate a clock signal involving a plurality of pulses each having a predetermined pulse width;

a gate circuit (608) connected to both said comparator and said timing pulse generator, allowing the clock signal from said timing pulse generator to pass only when the output of the comparator indicates the other logic indication; and a sampling-hold circuit (609) connected to the digital-to-analog converter for receiving the analog signal and also connected to said gate circuit to receive the clock signal from said timing pulse generator, then sampling the analog signal to hold an instantaneous value thereof for a predetermined time period in response to one of said plurality of pulses of the clock signal from said timing pulse generator until the next following one of said plurality of pulses from said timing pulse generator is applied to said sampling-hold circuit.

10. A system as claimed in claim 8, wherein said receiver further comprises a memory noise removing means which is connected to the digital-to-analog converter to remove noise resulting from partial trouble of said memory unit, which memory noise removing means includes:

a buffer amplifier connected to the digital-to-analog converter receiving the analog signal therefrom;

an integrator connected to said buffer amplifier to integrate the output thereof;

a comparator connected to both said digital-to-analog converter and said integrator, comparing the magnitudes of the outputs of the sames to generate one logic indication when the difference between the magnitudes exceeds a predetermined value, and, otherwise, to generate the other logic indication;

a timing pulse generator receiving said another clock signal to generate a clock signal involving a plurality of pulses each having a predetermined pulse width;

a gate circuit connected to both said comparator and said timing pulse generator, allowing the clock signal from said timing pulse generator to pass only when the output of the comparator indicates the other logic indication; and a sampling-hold circuit connected to the digital-to-analog converter for receiving the analog signal and also connected to said gate circuit to receive the clock signal from said timing pulse generator, then sampling the analog signal to hold an instantaneous value thereof for a predetermined time period in response to one of said plurality of pulses of the clock signal from said timing pulse generator until the next following one of said plurality of pulses from said timing pulse generator is applied to said sampling-hold circuit.

11. A system as claimed in claim 1, further comprising: a central processing unit (122) connected to base station; at least one local processing unit (120) connected to said central processing unit, said local processing unit being connected to a plurality of said peripheral units for controlling same in accordance with a signal fed from said central processing unit.

12. A system as claimed in claim 11, further comprising: a plurality of second peripheral units (114) connected to said local processing unit for controlling a plurality of said first communication units.

* * * * *